(12) United States Patent
Misaki et al.

(10) Patent No.: US 7,911,549 B2
(45) Date of Patent: Mar. 22, 2011

(54) LIQUID CRYSTAL DISPLAY DEVICE

(75) Inventors: Katsunori Misaki, Tottori (JP); Tetsuya Fujikawa, Tottori (JP); Yoshihisa Taguchi, Mie (JP); Kenichi Nagaoka, Kanagawa (JP); Manabu Sawasaki, Tottori (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/314,974

(22) Filed: Dec. 19, 2008

(65) Prior Publication Data

US 2009/0122245 A1 May 14, 2009

Related U.S. Application Data

(63) Continuation of application No. 11/333,548, filed on Jan. 18, 2006, now Pat. No. 7,471,348.

(30) Foreign Application Priority Data

Jan. 19, 2005 (JP) ................................ 2005-011519

(51) Int. Cl.
*G02F 1/1343* (2006.01)
(52) U.S. Cl. .............................. 349/38; 349/39; 349/144
(58) Field of Classification Search .................... 349/38, 349/39, 144
See application file for complete search history.

(56) References Cited

U.S. PATENT DOCUMENTS

| | | | |
|---|---|---|---|
| 4,840,460 A | 6/1989 | Bernot et al. | |
| 5,126,865 A | 6/1992 | Sarma | |
| 5,327,271 A | 7/1994 | Takeuchi et al. | |
| 5,576,863 A | 11/1996 | Aoki et al. | |
| 6,122,032 A * | 9/2000 | Mihara et al. | 349/155 |
| 6,705,584 B2 | 3/2004 | Hiroshima et al. | |
| 6,950,158 B2 * | 9/2005 | Chang | 349/114 |
| 7,206,048 B2 | 4/2007 | Song | |
| 7,209,205 B2 | 4/2007 | Yoshida et al. | |
| 7,471,348 B2 * | 12/2008 | Misaki et al. | 349/39 |
| 2003/0025868 A1 | 2/2003 | Hiroshima et al. | |
| 2003/0071952 A1 | 4/2003 | Yoshida et al. | |
| 2004/0141125 A1 | 7/2004 | Tashiro et al. | |
| 2005/0030439 A1 | 2/2005 | Lyu | |
| 2005/0030460 A1 | 2/2005 | Kim et al. | |
| 2006/0103800 A1 | 5/2006 | Li et al. | |

FOREIGN PATENT DOCUMENTS

JP 2-12 A 1/1990

(Continued)

*Primary Examiner* — Richard H Kim
(74) *Attorney, Agent, or Firm* — Nixon & Vanderhye P.C.

(57) ABSTRACT

There is provided an MVA type liquid crystal display device having high brightness and excellent display quality. The liquid crystal display device includes a pair of substrates disposed to be opposite to each other, a liquid crystal sealed between the pair of substrates, plural pixel areas each including a pixel electrode 16a formed on one of the substrates and a pixel electrode 16b separated from the pixel electrode 16a, a TFT 20 disposed in each of the pixel areas and including a source electrode 22 electrically connected to the pixel electrode 16a, a linear projection 42 formed on the other substrate and to regulate alignment of the liquid crystal, and a control capacitance section to capacity couple the source electrode 22 and the pixel electrode 16b and including a control capacitance electrode 33 which is electrically connected to the source electrode 22, is opposite to at least part of the pixel electrode 16b through an insulating film, and at least part of which is disposed to overlap with the linear projection 42 when viewed perpendicularly to a substrate surface and extends along the linear projection 42.

10 Claims, 19 Drawing Sheets

FOREIGN PATENT DOCUMENTS

| | | |
|---|---|---|
| JP | 5-66412 A | 3/1993 |
| JP | 6-332009 A | 12/1994 |
| JP | 09-080396 | 3/1997 |
| JP | 2005-4212 A | 1/2005 |
| JP | 2005-55896 A | 3/2005 |
| KR | 2003-0013263 A | 2/2003 |
| KR | 2003-0030822 A | 4/2003 |

* cited by examiner

LIQUID CRYSTAL DISPLAY DEVICE

This application is a continuation of U.S. patent application Ser. No. 11/333,548 filed Jan. 18, 2006, now U.S. Pat. No. 7,471,348 which claims priority under 35 U.S.C. §119(a) on Japanese Application 2005-011519 filed Jan. 17, 2005, all of which are incorporated herein by reference.

BACKGROUND OF THE INVENTION

1. Field of the Invention

The present invention relates to an MVA (Multi-domain Vertical Alignment) type liquid crystal display device in which one pixel includes plural alignment areas different from each other in the alignment direction of liquid crystal molecules, and particularly to a liquid crystal display device in which a pixel area is divided into plural sub-pixels.

2. Description of the Related Art

A liquid crystal display device is thin and lightweight as compared with a CRT (Cathode Ray Tube), and has merits that it can be driven by low voltage and its electric power consumption is small. Thus, the liquid crystal display device is used for various electronic devices such as a notebook PC (personal computer), a PDA (Personal Digital Assistant) and a cellular phone. Especially, an active matrix type liquid crystal display device in which a TFT (Thin Film Transistor) is provided as a switching element for each pixel has high drive capability. Since the active matrix type liquid crystal display device has excellent display characteristics comparable to a CRT, it comes to be used for a use for which a CRT is conventionally used, such as a desktop PC or a television receiver.

FIG. 15 shows a rough sectional structure of a conventional liquid crystal display device. As shown in FIG. 15, the liquid crystal display device includes a liquid crystal display panel 101. The liquid crystal display panel 101 includes a TFT substrate 102 on which a TFT and a pixel electrode are formed for each pixel, an opposite substrate 104 on which a color filter (CF) and a common electrode are formed, and a liquid crystal 106 sealed between both the substrates 102 and 104. Since a connection terminal is provided, the TFT substrate 102 is formed to be larger than the opposite substrate 104. Both the substrates 102 and 104 are bonded to each other through a sealing material 152 applied to an outer peripheral part. A cell gap between both the substrates 102 and 104 is kept by, for example, spherical spacers 146. Besides, polarizing plates 187 and 186 are disposed at both the outsides of the liquid crystal display panel 101. A backlight unit (not shown) is disposed below the polarizing plate 187 in the drawing.

Conventionally, a TN (Twisted Nematic) mode liquid crystal display device is widely used which includes a horizontally aligned liquid crystal having positive dielectric anisotropy and in which a liquid crystal molecule is twist-aligned. However, the TN mode liquid crystal display device has defects that a viewing angle characteristic is poor and when a screen is viewed from an oblique direction, the contrast and hue are remarkably changed. Thus, a VA (Vertically Aligned) mode liquid crystal display device having an excellent viewing angle characteristic and an MVA type liquid crystal display device have been developed and have been put to practical use.

FIGS. 16A and 16B schematically show sectional structures of an MVA type liquid crystal display device. A vertically aligned liquid crystal 106 having negative dielectric anisotropy is sealed between a TFT substrate 102 and an opposite substrate 104. A bank-shaped linear projection 143 as an alignment regulating structure to regulate the alignment of the liquid crystal 106 is formed on a pixel electrode 116 of the TFT substrate 102. A vertically aligned film 150 made of, for example, polyimide is formed on the pixel electrode 116 and the linear projection 143.

A bank-shaped linear projections 142 as an alignment regulating structures is formed on a common electrode 141 of the opposite substrate 104. The linear projection 142 is extended in parallel to the linear projection 143 on the TFT substrate 102 side, and is arranged to be shifted from the linear projection 143 by a half pitch. A vertically aligned film 151 made of, for example, polyimide is formed on the common electrode 141 and the linear projection 142.

In the MVA type liquid crystal display device, in a state where a voltage is not applied between the pixel electrode 116 and the common electrode 141, as shown in FIG. 16A, almost all liquid crystal molecules 108 are aligned almost perpendicularly to the substrate surface. However, the liquid crystal molecules 108 in the vicinities of the linear projections 142 and 143 are aligned almost perpendicularly to the inclined surfaces of the linear projections 142 and 143.

When a specified voltage is applied between the pixel electrode 116 and the common electrode 141, the liquid crystal molecules 108 are inclined with respect to the substrate surface by the influence of an electric field. In this case, as shown in FIG. 16B, the inclined directions of the liquid crystal molecule 108 are different at both sides of each of the linear projections 142 and 143. By this, the so-called alignment division (multi-domain) is realized.

As shown in FIG. 16B, in the MVA type liquid crystal display device, since the inclined directions of the liquid crystal molecules 108 at the time when the voltage is applied are different at both sides of each of the linear projections 142 and 143, the leakage of light in an oblique direction is suppressed, and an excellent viewing angle characteristic is obtained.

In the above example, although the description has been given to the case where the alignment regulating structures are the linear projections 142 and 143, a slit obtained by partially removing an electrode or a recess (groove) of a substrate surface may be used as an alignment regulating structure. Besides, in FIGS. 16A and 16B, although the description has been given to the example in which the alignment regulating structures are provided on both the TFT substrate 102 and the opposite substrate 104, the alignment regulating structure may be formed only on one of the TFT substrate 102 and the opposite substrate 104.

FIG. 17 shows an example in which a slit 145 as an alignment regulating structure is formed only in a pixel electrode 116 on a TFT substrate 102 side. The electric field is distorted in the vicinity of the slit 145, and the electric line of force extends in an oblique direction with respect to the substrate surface, and therefore, the inclined directions of liquid crystal molecules 108 are different at both sides of the slit 145. By this, the alignment division can be realized and the viewing angle characteristic is improved.

FIG. 18 shows a structure of one pixel of an MVA type liquid crystal display device in which a slit 145 is formed on a TFT substrate 102 side, and a linear projection 142 is formed on an opposite substrate 104 side. FIG. 19 shows a sectional structure of the TFT substrate 102 cut along line X-X of FIG. 18. As shown in FIG. 18 and FIG. 19, plural gate bus lines 112 extending in the horizontal direction in the drawing and plural drain bus lines 114 extending in the vertical direction in the drawing are respectively disposed at specified pitches on the TFT substrate 102. Rectangular pixel areas are defined by the gate bus liens 112 and the drain bus lines 114. Besides, on the TFT substrate 102, a storage capacitor bus line 118 is formed to be arranged in parallel with the gate bus line 112 and to cross the center part of each of the pixel areas. An insulating film 130 is formed between the drain bus line 114 and the gate bus line 112 or the storage capacitor bus line 118. The gate bus line 112 and the drain bus line 114, and the storage capacitor bus line 118 and the drain bus line 114 are electrically isolated by the insulating film 130.

A TFT 120, a pixel electrode 116 and a storage capacitor electrode 119 are formed for each of the pixel areas. The TFT 120 uses a part of the gate bus line 112 as its gate electrode. Besides, a drain electrode 121 of the TFT 120 is connected to the drain bus line 114, and a source electrode 122 is formed at a position opposite to the drain electrode 121 across the gate bus line 112. Further, the storage capacitor electrode 119 is formed at a position opposite to the storage capacitor bus line 118 across the insulating film 130.

The storage capacitor electrode 119, the TFT 120 and the drain bus line 114 are covered with a protecting film 131, and the pixel electrode 116 is disposed on the protecting film 131. The pixel electrode 116 is made of a transparent conductive film of ITO (Indium-Tin Oxide) or the like, and is electrically connected to the source electrode 122 of the TFT 120 and the storage capacitor electrode 119 through contact holes 125 and 126 formed in the protecting film 131. Besides, the two slits 145 extending in oblique directions are formed in the pixel electrode 116 to be almost linear symmetrical with respect to the storage capacitor bus line. The surface of the pixel electrode 116 is covered with a vertically aligned film (not shown) made of, for example, polyimide.

A light-shielding film (BM), a CF resin layer and a common electrode 141 are formed on the opposite substrate disposed to be opposite to the TFT substrate 102. The plural bank-shaped linear projections 142 bent above the gate bus line 112 and the storage capacitor bus line 118 are formed on the common electrode 141. The linear projections 142 are arranged to be shifted from the slits 145 of the pixel electrode 116 by a half pitch and in parallel therewith.

In the. MVA type liquid crystal display device as stated above, when a specified voltage is applied between the pixel electrode 116 and the common electrode 141, as shown in FIG. 18 and. FIG. 20, four alignment areas α, β, γ and δ are formed in which alignment directions of liquid crystal molecules 108 are different from each other. The alignment areas α to δ are divided while the linear projection 142 and the slit 145 are made boundaries. When the linear projection 142 and the slit 145 are formed so that the areas of the alignment areas α to δ become almost equal to each other in one pixel, the direction dependency of the viewing angle characteristic of the liquid crystal display device becomes low.

In the conventional MVA type liquid crystal display device, there occurs a phenomenon in which when a screen is viewed from an oblique direction, it becomes whitish. FIG. 21 is a graph showing transmissivity characteristics (T-V characteristics) with respect to applied voltage in the conventional MVA type liquid crystal display device. The horizontal axis indicates the applied voltage (V) to the liquid crystal layer, and the vertical axis indicates the light transmissivity. A curved line L indicates a T-V characteristic in a direction (hereinafter referred to as a front direction) perpendicular to a display screen, and a curved line M indicates a T-V characteristic in a direction (hereinafter referred to as an oblique direction) in which an azimuth angle is 90° with respect to the display screen and a polar angle is 60°. Here, the azimuth angle is an angle measured in a counterclockwise direction with respect to the right direction of the display screen. The polar angle is an angle formed relative to a perpendicular line standing at the center of the display screen.

As shown in FIG. 21, when a relatively high voltage of about 3 V or higher is applied to the liquid crystal layer, the transmissivity in the front direction is higher than the transmissivity in the oblique direction. On the other hand, when a voltage of about 2 to 3 V slightly higher than a threshold voltage is applied (region surrounded by a circle), the transmissivity in the oblique direction becomes higher than the transmissivity in the front direction. As a result, in the case where the display screen is viewed from an oblique direction, a brightness difference in an effective drive voltage range becomes small. This phenomenon appears most remarkably in the change of color. That is, since the brightness difference of the three primary colors of R, G and B becomes small, when viewed from the oblique direction, there occurs a phenomenon in which the color of the whole screen becomes whitish, and the reproducibility of the colors is lowered. This phenomenon is called discolor. The discolor occurs not only in the MVA type liquid crystal display device but also in the TN mode liquid crystal display device.

Patent document 1 (U.S. Pat. No. 4,840,460) proposes that one pixel is divided into plural sub-pixels, and those sub-pixels are capacity coupled. In such a liquid crystal display device, since a potential is divided based on the capacitance ratio of the respective sub-pixels, voltages different from each other can be applied to the liquid crystals of the respective sub-pixels. Accordingly, apparently, plural regions different in the threshold of the T-V characteristic exist in one pixel. As stated above, when the plural regions different in the threshold of the T-V characteristic exist in one pixel, the phenomenon in which the transmissivity in the oblique direction becomes higher than the transmissivity in the front direction, as shown in the circle of FIG. 21, is suppressed, and as a result, the phenomenon in which the screen becomes whitish is also suppressed. As stated above, a method in which one pixel is divided into plural capacity-coupled sub-pixels to improve the display characteristic is called a capacitive coupling HT (half tone gray scale) method.

Patent document 2 (JP-A-5-66412) discloses a liquid crystal display device having a structure in which as shown in FIG. 22, a pixel electrode is divided into four sub-pixel electrodes 116a to 116d, and control capacitance electrodes 117a to 117d are disposed below the respective sub-pixel electrodes 116a to 116d through an insulating film. In this liquid crystal display device, the sizes of the control capacitance electrodes 117a to 117d are different from each other, and display voltage is applied to the control capacitance electrodes 117a to 117d through a TFT 120. Besides, in order to prevent light from leaking between the sub-pixel electrodes 116a to 116d, a control capacitance electrode 115 is disposed also between the sub-pixel electrodes 116a to 116d.

Patent document 3 (JP-A-6-332009) also discloses a liquid crystal display device in which one pixel is divided into plural sub-pixels. In this liquid crystal display device, for example, a rubbing processing condition is changed for each sub-pixel, and pre-tilt angles of liquid crystal molecules of the sub-pixels are made different from each other.

All of these conventional techniques relate to the TN mode liquid crystal display device.

FIG. 23 shows a structure of one pixel of a conventional MVA type liquid crystal display device using the capacitive coupling HT method. FIG. 24 shows a sectional structure of the liquid crystal display device cut along line Y-Y of FIG. 23. As shown in FIG. 23 and FIG. 24, a TFT substrate 102 includes plural gate bus lines 112 formed on a glass substrate 110, and plural drain bus lines 114 crossing the gate bus lines 112 through an insulating film 130. The pitch of the gate bus lines 112 is, for example, about 300 µm, and the pitch of the drain bus lines 114 is, for example, about 100 µm. Rectangular pixel areas are defined by the gate bus lines 112 and the drain bus lines 114. Besides, on the TFT substrate 102, a storage capacitor bus line 118 is formed to be arranged in parallel with the gate bus line 112 and to cross the center of each of the pixel areas.

A TFT 120, control capacitance electrodes 133 and 134, and pixel electrodes 116a to 116d are formed for each of the pixel areas on the TFT substrate 102. The pixel electrodes 116a to 116d are mutually divided by slits 145. The slits 145 are extended in oblique directions, and are formed to be almost linear symmetrical with respect to the storage capacitor bus line 118.

The TFT 120 uses a part of the gate bus line 112 as its gate electrode. A drain electrode 121 of the TFT 120 is electrically connected to the drain bus line 114. A source electrode 122 is disposed at a position opposite to the drain electrode 121 through a channel protecting film 128 formed on the gate bus line 112. Besides, the source electrode 122 is electrically connected to the control capacitance electrodes 133 and 134.

The sub-pixel electrodes 116a to 116d are made of transparent electrode films of ITO or the like, and are mutually formed in the same layer. The width of the slit 145 to separate these sub-pixel electrodes 116a to 116d is, for example, 10 µm. The sub-pixel electrode 116a is electrically connected to the control capacitance electrode 133 through a contact hole 125, and the sub-pixel electrode 116d is electrically connected to the control capacitance electrode 133 through a contact hole 127. Partial areas of the sub-pixel electrodes 116b and 116c overlap with the control capacitance electrode 133 (134) through a protecting film 131. The sub-pixel electrodes 116b and 116c are indirectly connected to the control capacitance electrodes 133 and 134 by capacitive coupling through the control capacitance formed in the area. The control capacitance electrode 134 opposite to the storage capacitor bus line 118 through the insulating film 130 functions also as one electrode of the storage capacitor formed for each pixel while the storage capacitor bus line 118 is made the other electrode. The sub-pixel electrodes 116a to 116d are covered with a vertically aligned film 150 made of, for example, polyimide.

On the other hand, BMs 148 are formed on an opposite substrate 104. The BMs 148 are made of metal material such as, for example, Cr (chromium), and are disposed at positions opposite to the gate bus line 112 on the TFT substrate 102 side, the storage capacitor bus line 118, the drain bus line 114, and the TFT 120. A CF resin layer 140 is formed on the BM 148. The CF resin layer 140 of one color of R, G and B is disposed in each of the pixels.

A common electrode 141 made of a transparent conductive film of ITO or the like is formed on the CF resin layer 140. A bank-shaped linear projection 142 as an alignment regulating structure is formed on the common electrode 141. As shown in FIG. 23, the linear projection 142 is bent above the gate bus line 112 and the storage capacitor bus line 118, and is formed to be shifted from the slit 145 of the TFT substrate 102 by a half pitch and to be arranged in parallel therewith. The surfaces of the common electrode 141 and the linear projection 142 are covered with a vertically aligned film 151 made of, for example, polyimide.

When a specified gradation voltage is applied to the drain bus line 114, and a scanning signal is supplied to the gate bus line 112, the TFT 120 is turned on. When the TFT 120 is turned on, the gradation voltage is applied to the sub-pixel electrodes 116a and 116d electrically connected to the source electrode 122 and the control capacitance electrodes 133 and 134. Besides, since the sub-pixel electrodes 116b and 116c are capacity coupled to the control capacitance electrode 133 (134), the specified voltage is applied also to the sub-pixel electrodes 116b and 116c.

However, in the structure shown in FIG. 23 and FIG. 24, since the area of the sub-pixel electrode 116c is smaller than that of the sub-pixel electrode 116b, and an overlapping area with the control capacitance electrode 133 (134) is large, the voltage of the sub-pixel electrode 116c becomes higher than the voltage of the sub-pixel electrode 116b. When the voltage of the sub-pixel electrode 116a is A, the voltage of the sub-pixel electrode 116b is B, the voltage of the sub-pixel electrode 116c is C, and the voltage of the sub-pixel electrode 116d is D, A=D>C>B is established.

When the voltages are applied to the sub-pixel electrodes 116a to 116d as stated above, the liquid crystal molecules are inclined in the direction perpendicular to the direction in which the linear projection 142 and the slit 145 extend. At this time, the inclined directions of the liquid crystal molecules become opposite directions at both sides of each of the linear projection 142 and the slit 145. Since the different voltages are applied to the sub-pixel electrodes 116a and 116d, the sub-pixel electrode 116b and the sub-pixel electrode 116c, apparently, three areas where the thresholds of the T-V characteristics are mutually different exist in one pixel. By this, the phenomenon is suppressed in which when the screen is viewed from the oblique direction, the screen becomes whitish.

However, in the liquid crystal display device shown in FIG. 23 and FIG. 24, since the control capacitance electrodes 133 and 134 are formed of metal layers which are the same layers as the source electrode 122 and the drain electrode 121 and shield the light, there is a problem that the aperture ratio of the pixel is lowered and the brightness is lowered.

Besides, according to the film thickness of the protecting film 131 formed between the pixel electrodes 116b, 116c and the control capacitance electrodes 133, 134, light transmissivity, color viewing angle, the shift amount of a common potential and the like are degraded, and there is a problem that an excellent display quality can not be obtained.

SUMMARY OF THE INVENTION

The present invention has an object to provide a liquid crystal display device having high brightness and excellent display quality.

The object is achieved by a liquid crystal display device including a pair of substrates disposed to be opposite to each other, a liquid crystal sealed between the pair of substrates, a plurality of pixel areas each including a first pixel electrode formed on one of the substrates and a second pixel electrode formed on the one substrate and separated from the first pixel electrode, a transistor disposed in each of the pixel areas and including a source electrode electrically connected to the first pixel electrode, a linear alignment regulating structure formed on the other substrate and to regulate alignment of the liquid crystal, and a control capacitance section to capacity couple the source electrode and the second pixel electrode and including a control capacitance electrode which is electrically connected to the source electrode, is opposite to at least part of the second pixel electrode through an insulating film, and at least part of which is disposed to overlap with the alignment regulating structure when viewed perpendicularly to a substrate surface and extends along the alignment regulating structure.

According to the invention, the liquid crystal display device having high brightness and excellent display quality can be realized.

DETAILED DESCRIPTION OF THE INVENTION

First Embodiment

Figure 1:
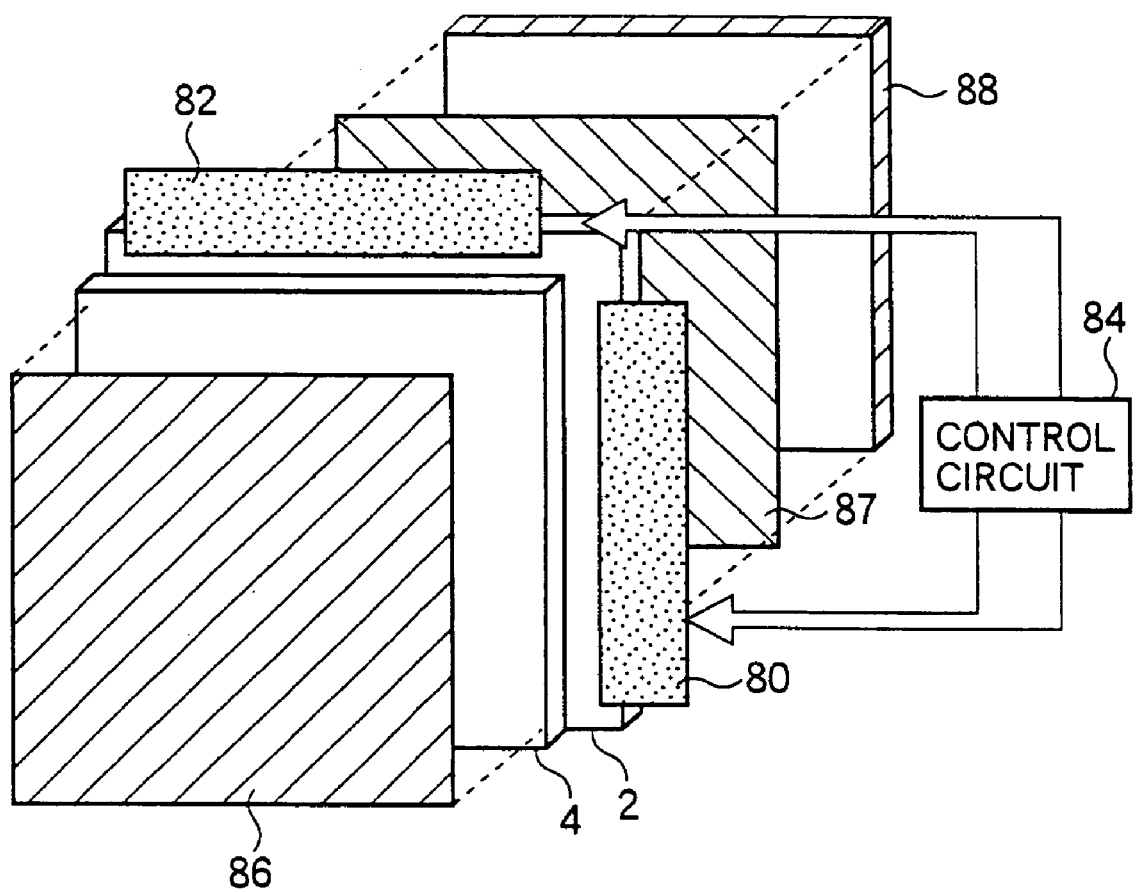
FIG. 1 is a view showing a rough structure of a liquid crystal display device according to a first embodiment of the invention.

A liquid crystal display device according to a first embodiment of the invention will be described with reference to FIGS. 1 to 7. FIG. 1 shows a rough structure of the liquid crystal display device according to this embodiment. As shown in FIG. 1, the liquid crystal display device includes a TFT substrate 2 on which gate bus lines and drain bus lines are formed to cross each other through an insulating film, and on which a TFT and a pixel electrode are formed for each pixel. Besides, the liquid crystal display device includes an opposite substrate 4 on which a CF and a common electrode are formed and which is disposed to be opposite to the TFT substrate 2, and a vertically aligned liquid crystal 6 (not shown in FIG. 1) sealed between both the substrates 2 and 4 and having negative dielectric anisotropy.

The TFT substrate 2 is connected with a gate bus line drive circuit 80 in which a driver IC to drive the plural gate bus lines is mounted and a drain bus line drive circuit 82 in which a driver IC to drive the plural drain bus lines is mounted. These drive circuits 80 and 82 output a scanning signal and a data signal to a specified gate bus line or drain bus line based on a specified signal outputted from a control circuit 84. A polarizing plate 87 is disposed on a surface of the TFT substrate 2 opposite to a TFT element formation surface thereof, and a polarizing plate 86 disposed in crossed Nicols with respect to the polarizing plate 87 is disposed on a surface of the substrate 4 opposite to a common electrode formation surface thereof. A backlight unit 88 is disposed to be opposite to the TFT substrate 2 across the polarizing plate 87 and is disposed on a surface thereof.

Figure 2:
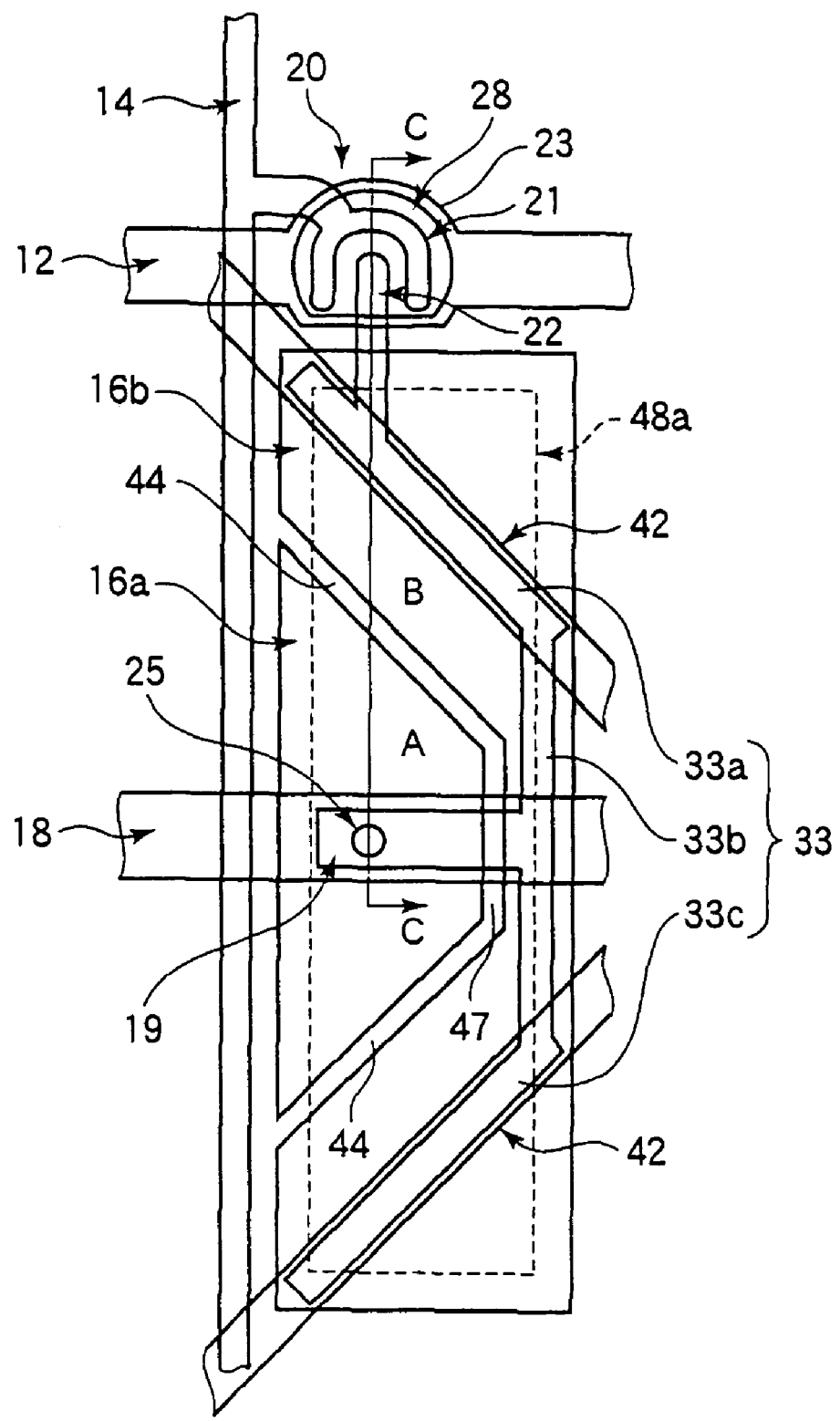
FIG. 2 is a view showing a structure of one pixel of the liquid crystal display device according to the first embodiment of the invention.
Figure 3:
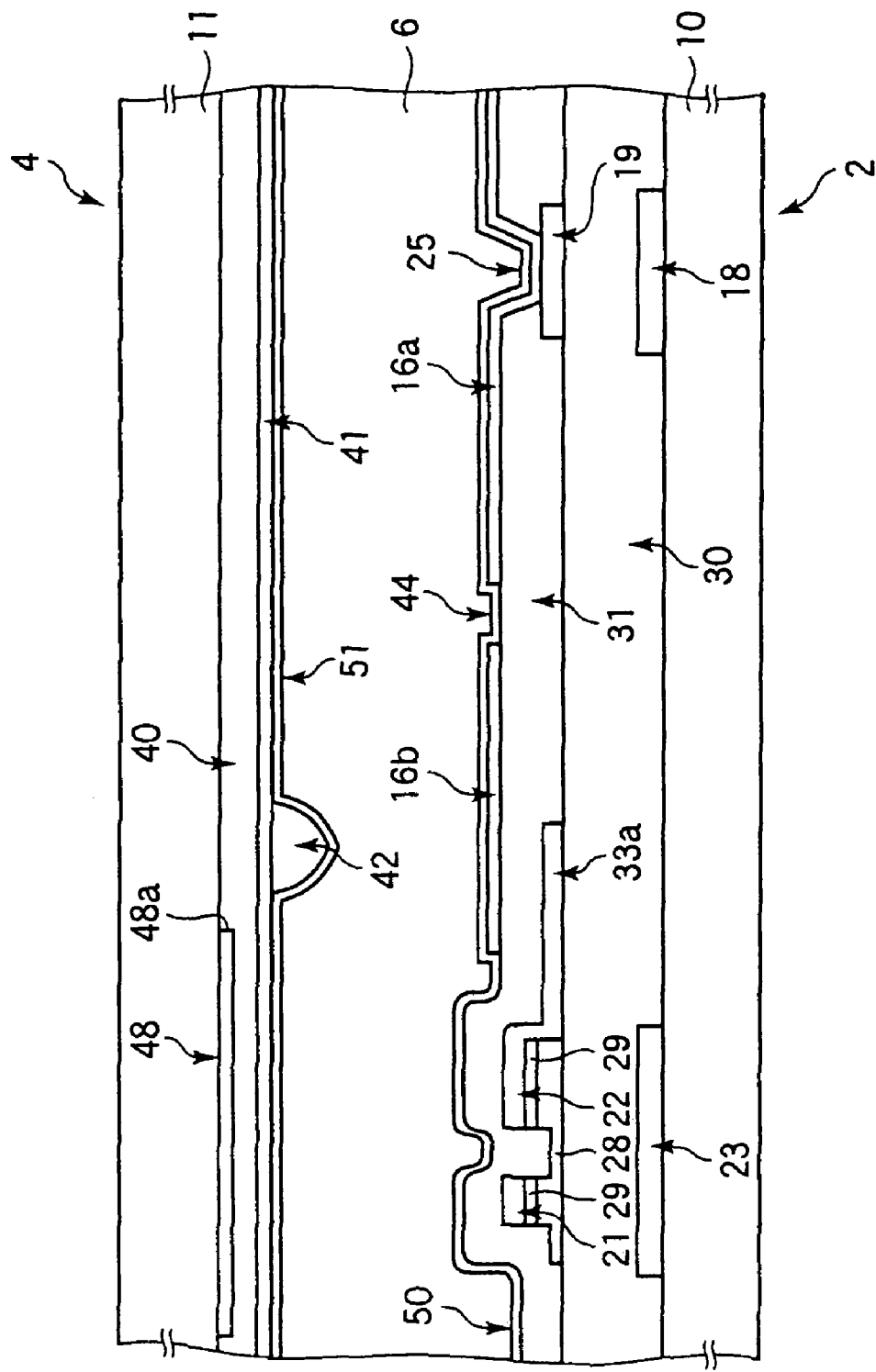
FIG. 3 is a sectional view showing a structure of the liquid crystal display device according to the first embodiment of the invention.

FIG. 2 shows a structure of one pixel of an MVA type liquid crystal display device, as the liquid crystal display device of this embodiment, using a capacitive coupling HT method when viewed from the opposite substrate 4 side. FIG. 3 shows a sectional structure of the liquid crystal display device cut along line C-C of FIG. 2. As shown in FIG. 2 and FIG. 3, the TFT substrate 2 of the liquid crystal display device of this embodiment includes plural gate bus lines 12 formed on a transparent thin plate such as a glass substrate 10, and plural drain bus lines 14 crossing the gate bus lines 12 through an insulating film 30. The pitch of the gate bus lines 12 is, for example, about 300 μm, and the pitch of the drain bus lines 14 is, for example, about 100 μm. Besides, on the TFT substrate 2, storage capacitor bus lines 18 arranged in parallel to the gate bus lines 12 are formed in the same layer as the gate bus lines 12.

For example, a channel etch type TFT 20 is formed in the vicinity of a cross position of the gate bus line 12 and the drain bus line 14. A gate electrode 23 of the TFT 20 is electrically connected to the gate bus line 12. An operating semiconductor layer 28 is formed on the gate electrode 23. A rod-like source electrode 22 and a C-shaped drain electrode 21 surrounding the source electrode 22 through a specified gap are formed on the operating semiconductor layer 28. The drain electrode 21 is electrically connected to the drain bus line 14.

A protecting film 31 made of, for example, a silicon nitride film (SiN film) is formed on the whole substrate surface on the TFT 20. Pixel electrodes 16a and 16b are formed on the protecting film 31 and in each intersection part of the gate bus lines 12 and the drain bus lines 14. A rectangular area in which the pixel electrodes 16*a* and 16*b* are formed is a pixel area. The pixel area is divided into a sub-pixel A in which the pixel electrode 16*a* is formed and a sub-pixel B in which the pixel electrode 16*b* is formed. The sub-pixel A has, for example, a trapezoidal shape, and is disposed at the center left of the pixel area. The sub-pixel B is disposed at the upper part, the lower part and the center right end of the pixel area in FIG. 2 except the sub-pixel A. The arrangement of the sub-pixels A and B is almost line symmetrical in one pixel with respect to the storage capacitor bus line 18. The pixel electrodes 16*a* and 16*b* are made of transparent conductive films of, for example, ITO or the like, and are respectively formed in the same layer.

The pixel electrodes 16*a* and 16*b* are separated from each other by slits 44, 47 and 44 surrounding three sides of the trapezoidal pixel electrode 16*a* to form a substantially C shape. The slit 44 extends obliquely to the end of the pixel area, and the slit 47 extends along the right end of the pixel area. The width of the slits 44, 47 is, for example 10 μm. The slit 44 functions also as an alignment regulating structure to regulate the alignment of the liquid crystal.

A control capacitance electrode 33 is formed in the sub-pixel B. The control capacitance electrode 33 is electrically connected to the source electrode 22, and is formed in the same layer as, for example, the source electrode 22. The control capacitance electrode 33 includes oblique extension parts 33*a* and 33*c* arranged in parallel to the slits 44 and extending obliquely to the end of the pixel area, and a connection part 33*b* extending along the right long side of the pixel area in FIG. 2 and connecting the oblique extension parts 33*a* and 33*c*. The control capacitance electrode 33 is disposed to overlap with a partial area of the pixel electrode 16*b* through the protecting film (insulating film) 31. A control capacitance Cc is formed as a control capacitance section between the pixel electrode 16*b* and the capacitance electrode 33 in the area where they are opposite to each other through the protecting film 31.

A storage capacitor electrode 19 is formed on the storage capacitor bus line 18 through the insulating film 30 for each pixel. A storage capacitor Cs is formed between the storage capacitor bus line 18 and the storage capacitor electrode 19 opposite to each other through the insulating film 30. The storage capacitor electrode 19 is electrically connected to the pixel electrode 16*a* through a contact hole 25 opened in the protecting film 31. Besides, the storage capacitor electrode 19 is electrically connected to the control capacitance electrode 33 and the source electrode 22.

The pixel electrode 16*a* of the sub-pixel A is electrically connected to the source electrode 22 of the TFT 20 through the storage capacitor electrode 19 and the control capacitance electrode 33. On the other hand, the pixel electrode 16*b* of the sub-pixel B is electrically in a floating state. The pixel electrode 16*b* is indirectly connected to the source electrode 22 by capacitive coupling through the control capacitance Cc. The pixel electrodes 16*a* and 16*b* and the protecting film 31 are covered with a vertically aligned film 50 made of, for example, polyimide.

On the other hand, the opposite substrate 4 includes a BM 48 which is formed on a glass substrate 11 and shields the end of the pixel area. The BM 48 is formed of metal material such as, for example, Cr, and is disposed at positions opposite to the gate bus line 12 on the TFT substrate 2 side, the drain bus line 14 and the TFT 20. An opening 48*a* of the BM 48 is narrower than the pixel area in which the pixel electrodes 16*a* 16*b* are formed in view of a bonding shift of both the substrates 2 and 4. A CF resin layer 40 is formed on the BM 48. The CF resin layer 40 of one color of R, G and B is disposed in each pixel.

A common electrode 41 made of a transparent conductive film of ITO or the like is formed on the CF resin layer 40. A liquid crystal capacitance Clc1 is formed between the pixel electrode 16*a* of the sub-pixel A and the common electrode 41 opposite to each other through the liquid crystal layer, and a liquid crystal capacitance Clc2 is formed between the pixel electrode 16*b* of the sub-pixel B and the common electrode 41. A bank-shaped linear projection 42 as an alignment regulating structure is formed on the common electrode 41. The linear projection 42 is formed by using a photosensitive resin or the like. The linear projection 42 is bent above the gate bus line 12 and the storage capacitor bus line 18, and is disposed in parallel to the slit 44 of the TFT substrate 2. The width of the linear projection 42 is about 8 to 12 μm (for example, 10 μm), and the height is about 1 to 1.6 μm. The surfaces of the common electrode 41 and the linear projection 42 are covered with a vertically aligned film 51 made of, for example, polyimide. Incidentally, as the alignment regulating structure on the opposite substrate 4, a slit obtained by partially removing the common electrode 41 may be formed instead of the linear projection 42.

It is assumed that the TFT 20 is turned on, a specified voltage is applied to the pixel electrode 16*a*, and a voltage Vpx1 is applied to the liquid crystal layer of the sub-pixel A. At this time, since the potential is divided in accordance with the capacitance ratio of the liquid crystal capacitance Clc2 and the control capacitance Cc, a voltage different from that of the pixel electrode 16*a* is applied to the pixel electrode 16*b* of the sub-pixel B. A voltage Vpx2 applied to the liquid crystal layer of the sub-pixel B is $Vpx2=(Cc/(Clc2+Cc))\times Vpx1$.

Where, because of $0<(Cc/(Clc2+Cc))<1$, except Vpx1=Vpx2=0, the voltage Vpx2 becomes smaller than the voltage Vpx1 (|Vpx2|<|Vpx1|). As stated above, in the liquid crystal display device of this embodiment, the voltage Vpx1 applied to the liquid crystal layer of the sub-pixel A and the voltage Vpx2 applied to the liquid crystal layer of the sub-pixel B can be made different from each other in one pixel. By this, since the distortion of the T-V characteristic is dispersed in one pixel, the phenomenon is suppressed in which the color of an image becomes whitish when viewed from an oblique direction, and the liquid crystal display device can be obtained in which the viewing angle characteristic is improved and the viewing angle is wide.

Here, at least part of the oblique extension parts 33*a* and 33*c* of the control capacitance electrode 33 formed on the TFT substrate 2 extends along the linear projections 42 formed on the opposite substrate 4, and is disposed to overlap with the linear projections 42 when viewed perpendicularly to the substrate surface. The widths of the oblique extension parts 33*a* and 33*c* (and the connection part 33*b*) are narrower than the width of the linear projection 42. In this example, each of the oblique extension parts 33*a* and 33*c* is disposed inside of both side ends of the linear projection 42 when viewed perpendicularly to the substrate surface, and substantially the whole region of the oblique extension parts 33*a*, 33*c* overlaps with the linear projection 42. Besides, at least part of the control capacitance electrode 33 is disposed to overlap with the BM 48 when viewed perpendicularly to the substrate surface. For example, an area having an area ratio of 60% or more in the connection part 33*b* overlaps with the BM 48.

In the formation area of the linear projection 42 in the pixel, the light transmissivity is low as compared with the other area. In this embodiment, at least part of the control capacitance electrode 33 is disposed to overlap with the linear projection 42, so that the substantial aperture ratio of the pixel is improved, and as compared with the related art, a further bright display is enabled. Similarly, at least part of the control capacitance electrode 33 is disposed to overlap with the BM 48 to shield the light, so that the aperture ratio of the pixel is improved, and as compared with the related art, a further bright display is enabled.

The voltage ratio Vpx2/Vpx1 (=Cc/(Clc2+Cc)) of the sub-pixels A and B becomes large (approaches 1) as the capacitance ratio Cc/Clc2 becomes large, and it becomes small (approaches 0) as the capacitance ratio Cc/Clc2 becomes small. Accordingly, the voltage ratio Vpx2/Vpx1 can be changed by adjusting the control capacitance Cc. The control capacitance Cc is determined by the overlap area between the control capacitance electrode 33 and the pixel electrode 16b, the film thickness of the protecting film 31, and the dielectric constant of the formation material of the protecting film 31. However, in this embodiment, since SiN is used as the formation material of the protecting film 31, the dielectric constant is almost constant.

Figure 4:
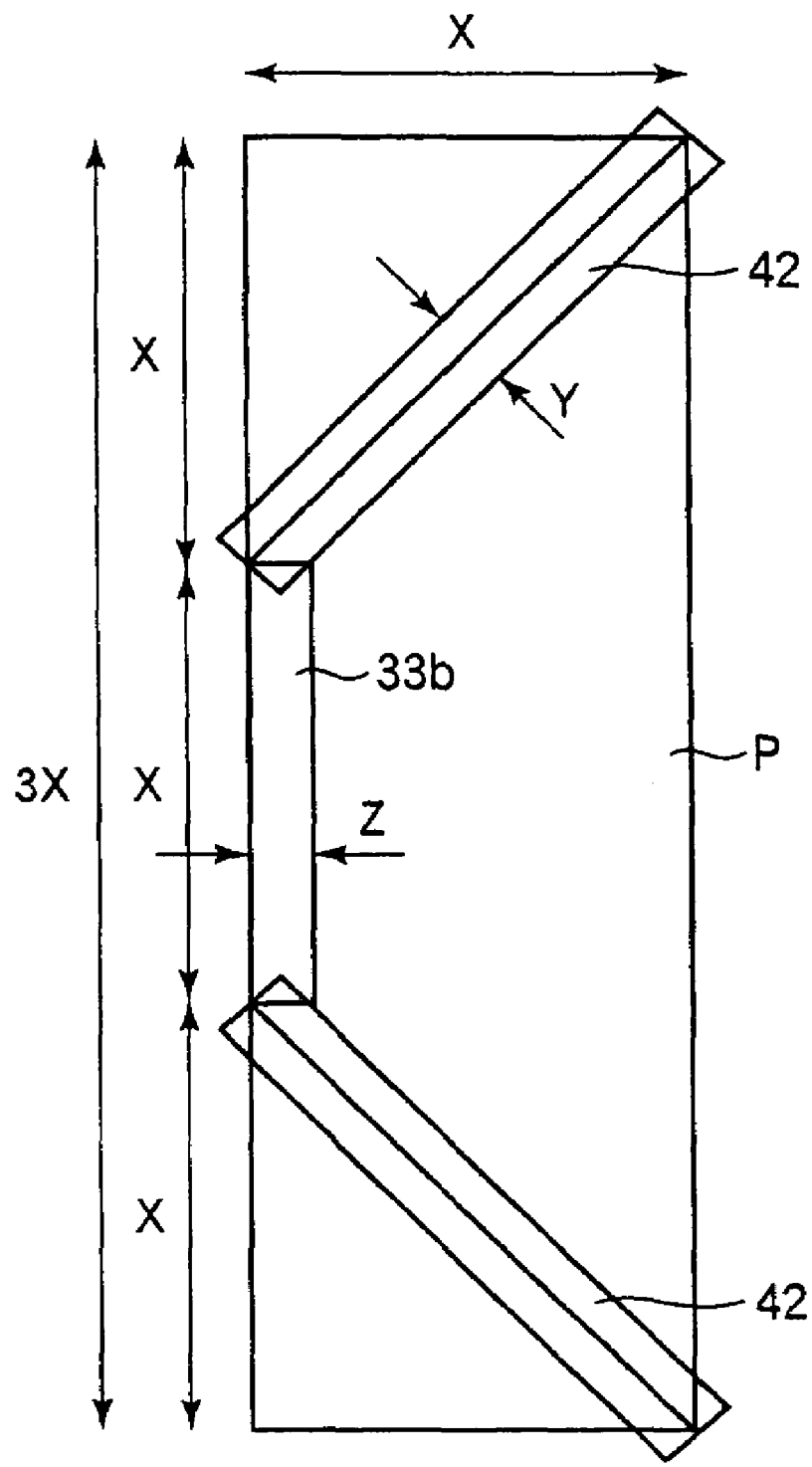
FIG. 4 is a view schematically showing a pixel area P, a linear projection 42, and a connection part 33b of a control capacitance electrode 33.

FIG. 4 schematically shows a structure, when viewed from the TFT substrate 2 side, of the pixel area P in which the pixel electrodes 16a and 16b (and the slits 44 and 47) are formed, the linear projection 42, and the connection part 33b of the control capacitance electrode 33. As shown in FIG. 4, the pixel area P has a rectangular shape with a short side of a length X and a long side of a length 3X. The length X is about 50 to 100 µm, for example, 65 µm. The linear projection 42 in the pixel area P has two regions which pass two corner parts located at both ends of the right long side of the pixel area P in the drawing and linearly extend in directions each of which forms an angle of 45° with respect to the long side and which are almost perpendicular to each other. The width of the linear projection 42 is Y (for example, 10 µm). The overlap widths between the oblique extension parts 33a and 33c (not shown in FIG. 4) of the control capacitance electrode 33 respectively extending along the two regions and the linear projections 42 are, for example, 7 µm. The connection part 33b of the control capacitance electrode 33 extends along the left long side of the pixel area P in the drawing. The length of the connection part 33b is X equal to the length of the short side of the pixel area P, and the width of the connection part 33b is Z (about 2 to 15 µm (for example, 5 µm)). In this embodiment, the area S of the control capacitance electrode 33 in the pixel area P (that is, the overlap area between the control capacitance electrode 33 and the pixel electrode 16b) satisfies a relation of expression (1).

$$S \leq (Y \times \sqrt{(X^2+X^2)} - Y^2/2) \times 2 + X \times Z \quad (1)$$

For example, in the case of X=65 (µm), Y=10 (µm) and Z=5 (µm), the area S is made almost 2100 µm² or less. In this example, the area S is made 1146.07 µm². Incidentally, in the case where the size of the pixel area P is different, the widths of the oblique extension parts 33a and 33c of the control capacitance electrode 33 are changed, or the length of the oblique extension part 33c is changed to adjust the area S of the control capacitance electrode 33.

Figure 5:
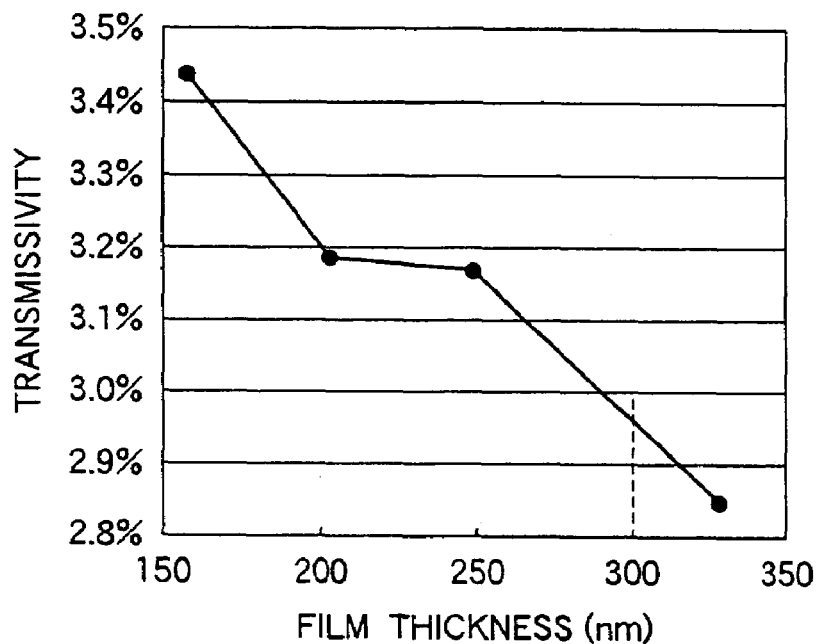
FIG. 5 is a graph showing a relation between film thickness of a protecting film 31 and light transmissivity of a pixel.

FIG. 5 is a graph showing a relation between the film thickness of the protecting film 31 in the case of the area S of 1146.07 µm² and the light transmissivity of the pixel at the time when a specified voltage is applied. The horizontal axis indicates the film thickness (nm), and the vertical axis indicates the transmissivity. As shown in FIG. 5, as the film thickness of the protecting film 31 becomes large, the light transmissivity is decreased. When the film thickness of the protecting film 31 is made almost 300 nm or less, even when consideration is given to the variation of the area S within the range of satisfying the expression (1), the light transmissivity of 3.0% or more is obtained, and it is understood that the liquid crystal display device with high brightness can be realized.

Figure 6:
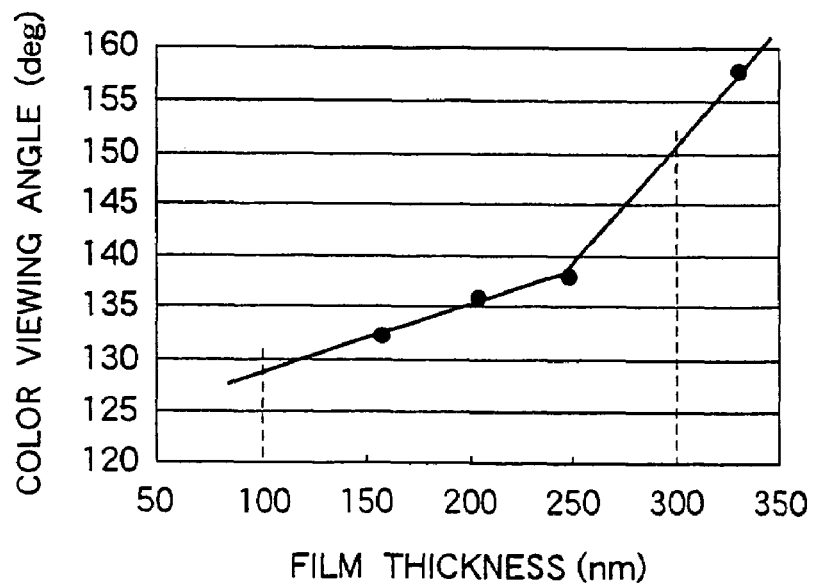
FIG. 6 is a graph showing a relation between the film thickness of the protecting film 31 and color viewing angle.

FIG. 6 is a graph showing a relation between the film thickness of the protecting film 31 in the case of the area S of 1146.07 µm² and the color viewing angle (Δu'v'<0.04). The horizontal axis indicates the film thickness (nm), and the vertical axis indicates the color viewing angle (deg). As shown in FIG. 6, as the film thickness of the protecting film 31 becomes small, the color viewing angle is decreased. When the film thickness of the protecting film 31 is made about 100 nm or more, even when consideration is given to the variation of the area S within the range of satisfying the expression (1), the color viewing angle of 130° or more is obtained, and it is understood that the liquid crystal display device in which the discolor does not occur can be realized. From the graphs shown in FIG. 5 and FIG. 6, it is understood that when the film thickness of the protecting film 31 is made not less than about 100 nm and not larger than 300 nm (for example, 200 nm), the liquid crystal display device can be obtained in which the brightness is high, the discolor does not occur, and the display quality is excellent. Incidentally, in this example, the control capacitance Cc is about 305 to 405 fF (for example, 355.2 fF). Besides, in the case where the film thickness of the protecting film 31 is made 200 nm, the range of the area S in which excellent display quality is obtained is approximately from 980 to 1325 µm².

Figure 7:
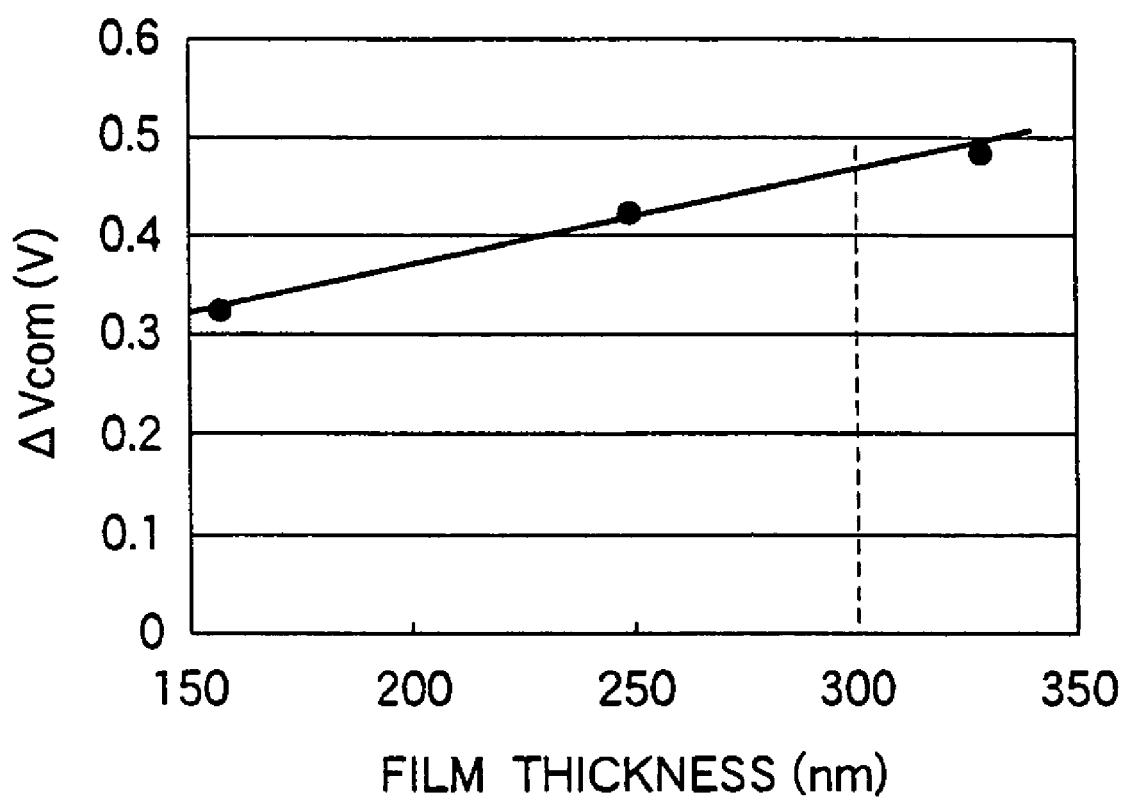
FIG. 7 is a graph showing a relation between the film thickness of the protecting film 31 and the shift amount ΔVcom of a common potential.

FIG. 7 is a graph showing a relation between the film thickness of the protecting film 31 in the case where the area S is 1146.07 µm² and the shift amount ΔVcom of a common potential. The horizontal axis indicates the film thickness (nm), and the vertical axis indicates the shift amount ΔVcom (V) of the common potential at 223 gradations in the case where white is displayed for 120 minutes. As shown in FIG. 7, as the film thickness of the protecting film 31 becomes large, the shift amount ΔVcom becomes large. As stated above, when the film thickness of the protecting film 31 is made 300 nm (100 nm or more), the shift amount ΔVcom of the common potential is suppressed to about 0.47 V or less, and it is understood that burn-in or the like hardly occurs, and excellent display quality is obtained.

Next, a manufacturing method of the liquid crystal display device according to this embodiment will be described with reference to FIG. 2 and FIG. 3. First, the manufacturing method of the TFT substrate 2 will be described.

A metal film made of Cr or a metal film having a laminate structure of Al (aluminum) and Ti (titanium) is formed by, for example, a PVD (Physical Vapor Deposition) method on the glass substrate 10. Thereafter, a photolithography method is used to pattern this metal film to form the gate bus line 12, the gate electrode 23 and the storage capacitor bus line 18. Incidentally, in order to prevent impurities from diffusing from the glass substrate 10, the metal film may be formed after the surface of the glass substrate 10 is covered with an insulating film.

Next, silicon oxide or silicon nitride is deposited on the gate bus line 12, the gate electrode 23 and the storage capacitor bus line 18 and on the whole substrate surface by, for example, a CVD (Chemical Vapor Deposition) method, and the insulating film 30 covering the gate bus line 12 and the storage capacitor bus line 18 is formed.

Next, an amorphous silicon (a-Si) film (or polysilicon (p-Si) film) having a thickness of 80 to 200 nm and an a-Si film (n⁺a-Si film) in which an n-type impurity is introduced at high concentration are successively formed on the whole surface of the insulating film 30 by using, for example, the CVD method. Thereafter, the n⁺a-Si film and the a-Si film (or p-Si film) are patterned by the photolithography method to form island regions, and an ohmic contact layer 29 of the TFT 20 and the operating semiconductor layer 28 are formed.

Next, a metal film having a laminate structure of, for example, Ti—Al—Ti is formed on the ohmic contact layer 29 and on the whole substrate surface. The metal film, the ohmic contact layer 29 and the operating semiconductor layer 28 are patterned by the photolithography method to define the shape of the operating semiconductor layer 28 of the TFT 20 and to form the drain bus line 14, the source electrode 22, the drain electrode 21, the control capacitance electrode 33 and the storage capacitor electrode.

Next, silicon nitride of 200 nm is deposited on the drain bus line 14 and the like and the whole substrate surface by, for example, the CVD method to form the protecting film 31. Then, the contact hole 25 leading to the storage capacitor electrode 19 is formed at a specified position of the protecting film 31 by the photolithography method.

Next, an ITO film is formed on the protecting film 31 and on the whole surface by the sputtering method. Thereafter, the ITO film is patterned by the photolithography method to form the pixel electrodes 16a and 16b. The pixel electrode 16a is electrically connected to the storage capacitor electrode 19 through the contact hole 25. Next, polyimide is coated on the pixel electrodes 16a and 16b and on the whole substrate surface to form the vertically aligned film 50. The TFT substrate 2 is completed in this way.

Next, a manufacturing method of the opposite substrate 4 will be described. First, a metal film of, for example, Cr is formed on the whole surface of the glass substrate 11. This metal film is patterned to form the BM 48 at positions corresponding to the gate bus line 12 on the TFT substrate 2 side, the drain bus line 14 and the TFT 20.

Next, for example, a red photosensitive resin, a green photosensitive resin, and a blue photosensitive resin are used to successively form the CF resin layers 40 of R, G and B in each pixel area. The CF resin layer 40 of one color of red, green and blue is disposed for each pixel.

Next, an ITO film is formed on the CF resin layer 40 by the sputtering method, and the common electrode 41 is formed. Next, for example, a photoresist is used to form the bank-shaped linear projection 42 made of a dielectric on the common electrode 41. Next, polyimide is coated on the common electrode 41 and the linear projection 42 and on the whole substrate surface to form the vertically aligned film 50. The opposite substrate 4 is completed in this way.

The TFT substrate 2 and the opposite substrate 4 fabricated through the above process are boned to each other through, for example, a spherical spacer. Next, the vertically aligned liquid crystal 6 having negative dielectric anisotropy is injected and sealed between the TFT substrate 2 and the opposite substrate 4. In this way, the liquid crystal display device of this embodiment is completed. As described above, according to this embodiment, the liquid crystal display device having high brightness and excellent display quality can be obtained.

Second Embodiment

Figure 8:
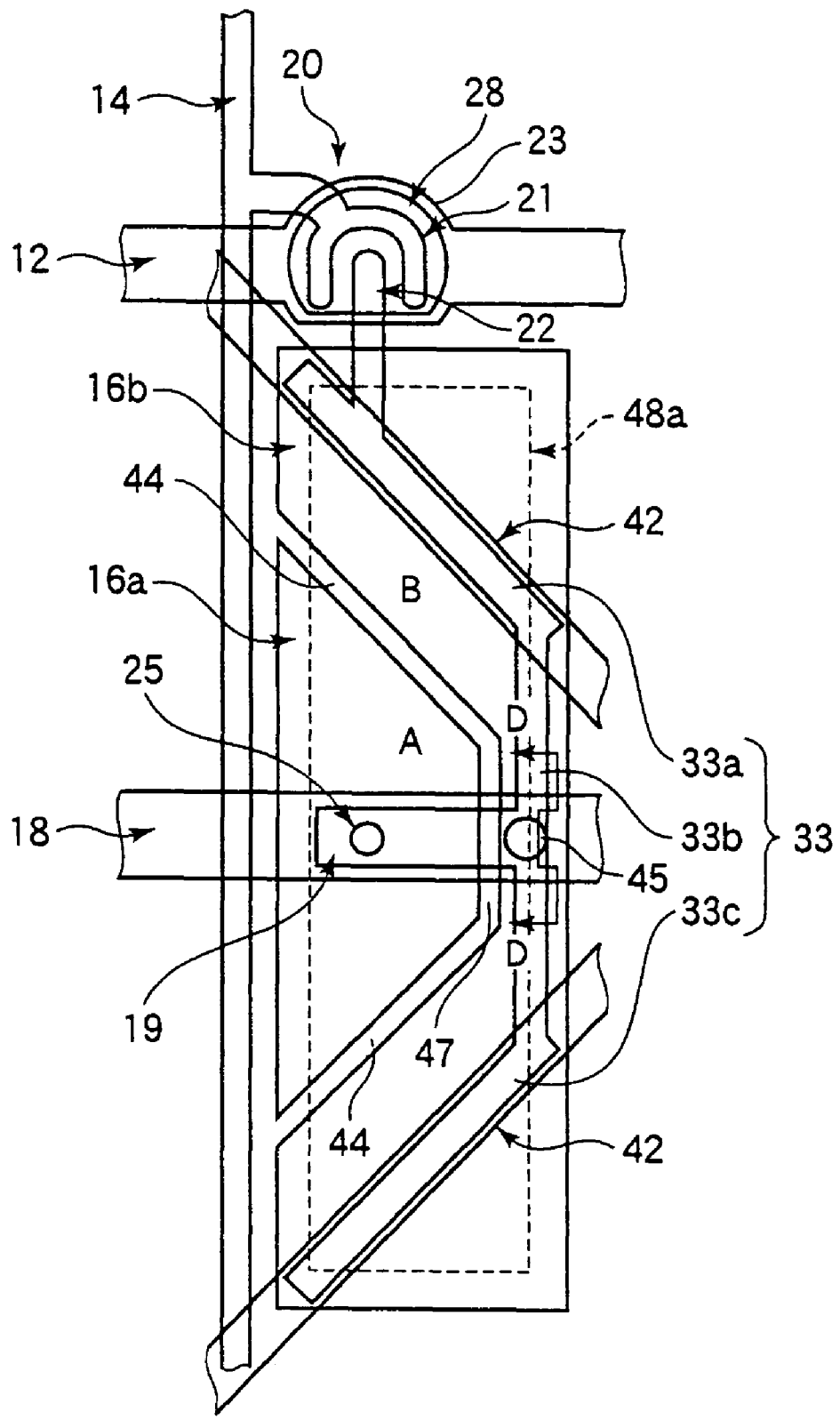
FIG. 8 is a view showing a structure of a B pixel of a liquid crystal display device according to a second embodiment of the invention.
Figure 9:
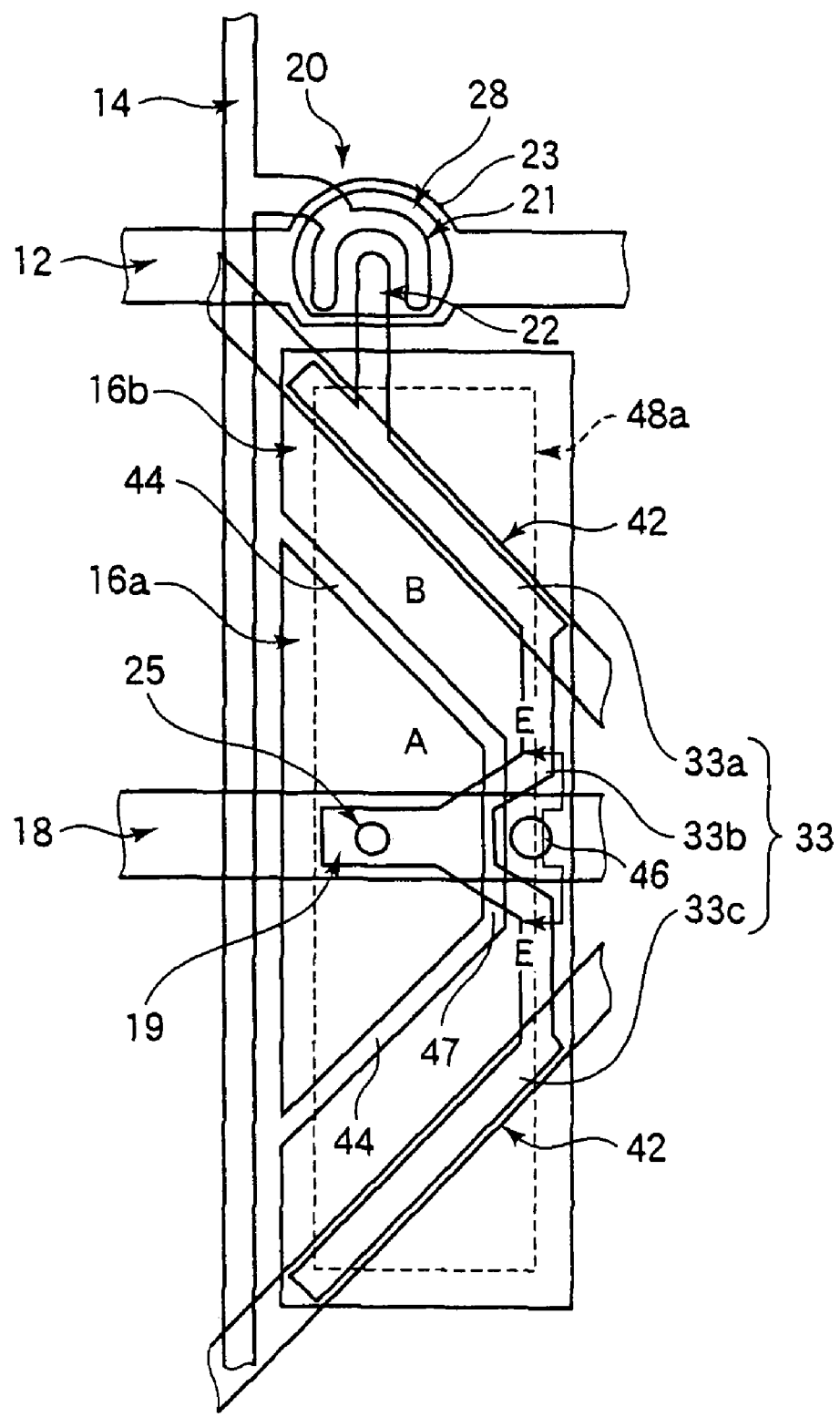
FIG. 9 is a view showing a structure of an R pixel or a G pixel of the liquid crystal display device according to the second embodiment of the invention.
Figure 10A:
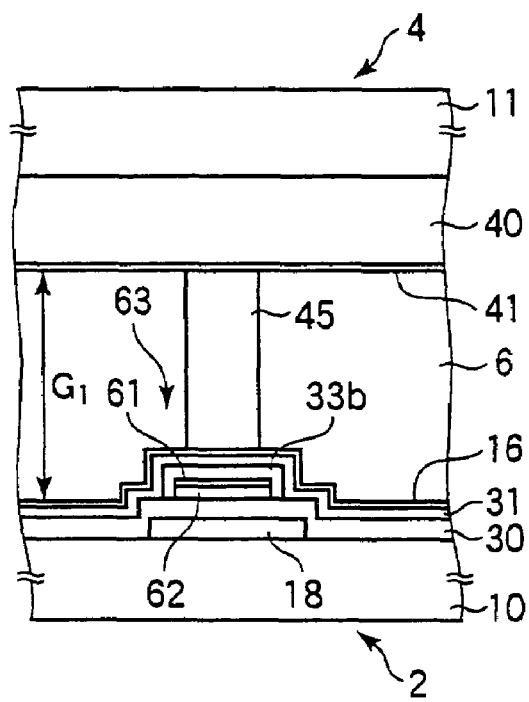
FIGS. 10A and 10B are views showing sectional structures of the liquid crystal display device according to the second embodiment of the invention.
Figure 10B:
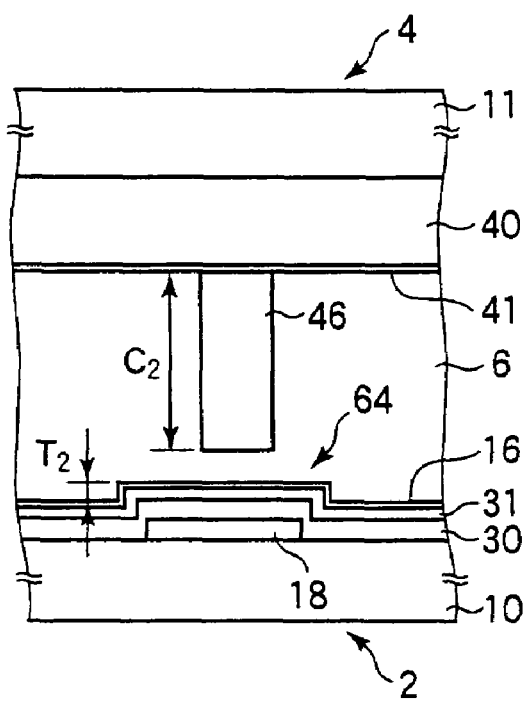
Figure 11A:
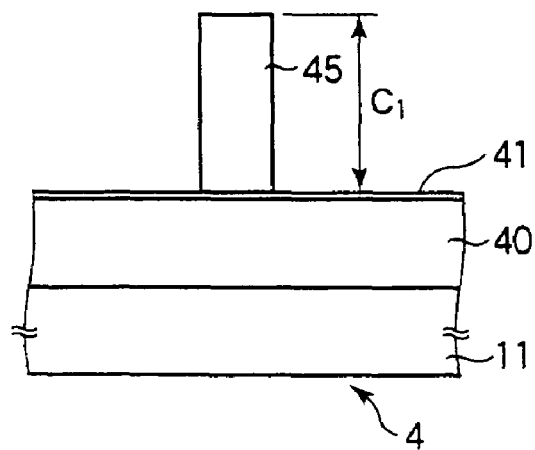
FIGS. 11A and 11B are sectional views showing structures of an opposite substrate 4 before being bonded to a TFT substrate 2.
Figure 11B:
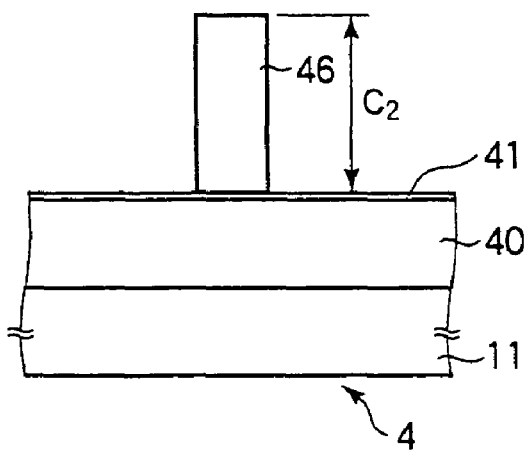
Figure 12A:
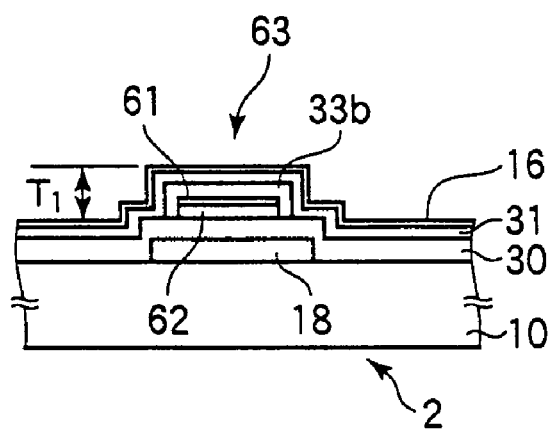
FIGS. 12A and 12B are sectional views showing structures of the TFT substrate 2 before being bonded to the opposite substrate 4.
Figure 12B:
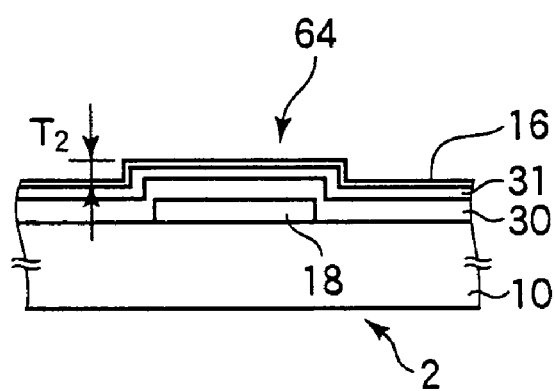

Next, a liquid crystal display device according to a second embodiment of the invention will be described with reference to FIGS. 8 to 14F. FIG. 8 shows a structure of a B pixel (pixel in which a blue CF resin layer is formed) of the liquid crystal display device of this embodiment, and FIG. 9 shows a structure of an R pixel or a G pixel (pixel in which a red or a green CF resin layer is respectively formed) of the liquid crystal display device of this embodiment. FIG. 10A shows a sectional structure of the liquid crystal display device cut along line D-D of FIG. 8, and FIG. 10B shows a sectional structure of the liquid crystal display device cut along line E-E of FIG. 9. FIG. 11A and FIG. 11B show sectional structures of an opposite substrate 4 before being bonded to the TFT substrate 2. FIG. 11A shows the sectional structure of the opposite substrate 4 cut at the same position as FIG. 10A, and FIG. 11B shows the sectional structure of the opposite substrate 4 cut at the same position as FIG. 10B. FIG. 12A and FIG. 12B show sectional structures of the TFT substrate 2 before being bonded to the opposite substrate 4. FIG. 12A shows the sectional structure of the TFT substrate 2 cut at the same position as FIG. 10A, and FIG. 12B shows the sectional structure of the TFT substrate 2 cut at the same position as FIG. 10B.

As shown in FIGS. 8 to 12B, in this embodiment, the B pixel is different from the R pixel or the G pixel in the structure on the TFT substrate 2 side. The B pixel of the TFT substrate 2 has almost the same structure as that of FIG. 2. In the B pixel on the opposite substrate 4 side, a column spacer 45 made of, for example, acrylic resin negative photosensitive resist is formed in a region where a connection part 33b and a storage capacitor electrode 19 cross each other to form a T shape. When the structures of the formation region of the column spacer 45 and a pixel opening part on the TFT substrate 2 side are compared with each other, the formation region of the column spacer 45 includes a storage capacitor bus line 18 formed in the same layer as a gate electrode 23 of a TFT 20, an a-Si layer 62 formed in the same layer as an operating semiconductor layer 28, an n$^+$a-Si layer 61 formed in the same layer as an ohmic contact layer 29, and the connection part 33b (storage capacitor electrode 19) formed in the same layer as a source electrode 22 and a drain electrode 21. By this, a protrusion 63 having a height T1 is formed in the formation region of the column spacer 45. The column spacer 45 and the protrusion 63 constitute a first cell gap keeping structure. The first cell gap keeping structure is in contact with both the opposite substrate 4 and the TFT substrate 2, and keeps a cell gap G1.

A column spacer 46 in the same layer as the column spacer 45 is formed on the opposite substrate 4 of the R pixel and the G pixel. Differently from the structure of the B pixel, a connection part 33b and a storage capacitor electrode 19 of the R pixel and the G pixel are disposed to detour around the formation region of the column spacer 46. Accordingly, although the formation region of the column spacer 46 has the storage capacitor bus line 18, as compared with the formation region of the column spacer 45, the a-Si layer 62, the n$^+$a-Si layer 61 and the connection part 33b are not provided. By this, a protrusion 64 having a height T2 lower than the protrusion 63 by the sum total of the respective film thicknesses of the a-Si layer 62, the n$^+$a-Si layer 61 and the connection part 33b are formed in the formation region of the column spacer 46 (T1>T2). In this example, the difference (T1−T2) between the height T1 and the height T2 is, for example, 0.50 μm. The column spacer 46 and the protrusion 64 constitute a second cell gap keeping structure. A height C1 of the column spacer 45 from the common electrode 41 and a height C2 of the column spacer 46 from the common electrode 41 are almost equal to each other before the substrates are bonded (C1=C2), and are both, for example, 3.2 μm.

The liquid crystal display device according to this embodiment is manufactured by using a one drop fill (ODF) method, and a sealing material continuously coated to seal the liquid crystal is formed on the outer peripheral part between the substrates 2 and 4. The cell gap G1 of the liquid crystal display device manufactured using the ODF method is determined by the amount of liquid crystal to be dropped. In this embodiment, the amount of liquid crystal to be dropped is determined so that the cell gap G1 between the substrates 2 and 4 satisfies the relation of (T1+C1)<G1<(T2+C2). Accordingly, the column spacer 45 and the protrusion 63 are contact with each other, and are compressed by (G1−(T2+C2)) (for example, 0.25 μm). On the other hand, the column spacer 46 and the protrusion 64 are not in contact with each other and are opposite to each other through a gap of (G1−(T1+C1)) (for example, 0.25 μm). That is, the first cell gap keeping structure including the column spacer 45 and the protrusion 63 always keeps the cell gap G1, and the second cell gap keeping structure including the column spacer 46 and the protrusion 64 keeps the cell gap G2 (not shown) narrower than the cell gap G1 when pressure is applied from outside.

The upper bottom area (support area of the first cell gap keeping structure) S1 of the column spacer 45 and the upper bottom area (support area of the second cell gap keeping structure) S2 of the column spacer 46 are almost equal to each other (S1=S2), and are both, for example, 300 μm². The column spacer 45 is disposed for every five B pixels, and the column spacer 46 is disposed in every R pixel and every G pixel. Accordingly, the area density D1 of the first cell gap keeping structure is 1/10 of the area density D2 of the second cell gap keeping structure (D1:D2=1:10). Incidentally, the structure of the B pixel on the TFT 2 side in which the column spacer 45 is not formed may be similar to the structure of the R pixel and the G pixel on the TFT substrate 2 side.

For example, even in the case where the column spacer 45 is formed to be lower by 0.15 μm because of manufacture variation, after the substrates are bonded to each other, the column spacer 45 (and the protrusion 63) is compressed by 0.10 μm. Accordingly, the manufactured liquid crystal display panel has an inner pressure in which uneven gravity does not occur. On the other hand, even in the case where the column spacer 46 is formed to be higher by 0.15 μm, after the substrates are bonded to each other, since there is a gap of 0.10 μm between the column spacer 46 and the protrusion 64, they are not in contact with each other at a room temperature. Accordingly, occurrence of bubbles at a low temperature can be prevented.

Besides, when a high pressure is applied between the substrates 2 and 4 of the liquid crystal display panel from outside, in addition to the first cell gap keeping structure, the second cell-gap keeping structure keeps the cell gap. Accordingly, uneven cell gap does not occur, and high resistance to the outside pressure is obtained.

According to this embodiment, in addition to the same effect as the first embodiment, when pressure is not applied from outside, since only the first cell gap keeping structure formed at the low area density D1 keeps the cell gap G1, the occurrence of bubbles at a low temperature can be prevented. On the other hand, when pressure is applied from outside, since the first and the second cell gap keeping structures formed at a high area density (D1+D2) keep the cell gap G2, uneven cell gap can be suppressed. Besides, according to this embodiment, in the liquid crystal display device manufactured by using the ODF method, two contradictory effects of a wide manufacture margin and high resistance to pressure can be simultaneously realized.

Figure 13A:
FIGS. 13A to 13E are views showing manufacturing steps of the opposite substrate 4.
Figure 13B:
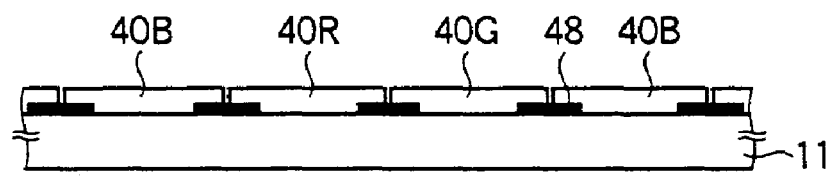

Next, a manufacturing method of the liquid crystal display device according to this embodiment will be described in brief. FIGS. 13A to 13E show manufacture steps of the opposite substrate 4. First, as shown in FIG. 13A, a BM 48 is formed on an insulating substrate, such as a glass substrate 11, by using Cr metal or resin black. Next, as shown in FIG. 13B, pigment dispersion photosensitive colored resin or the like is used to successively form CF resin layers 40R, 40G and 40B.

Figure 13C:
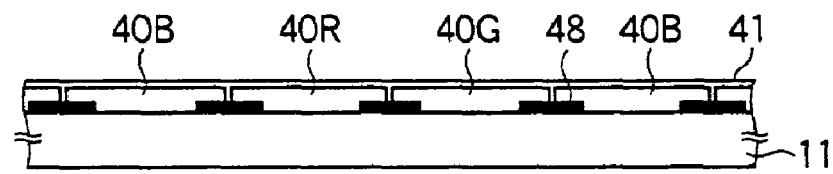
Figure 13D:
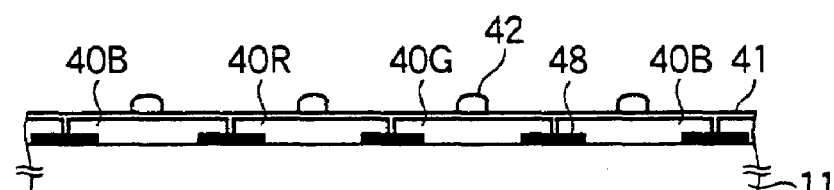
Figure 13E:
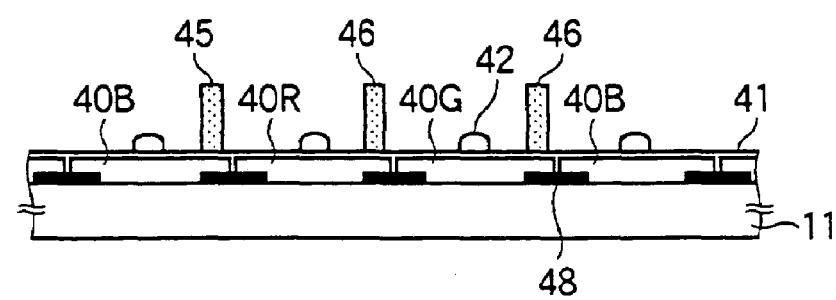

Next, as shown in FIG. 13C, a transparent conductive film of ITO or the like is sputtered to form a common electrode 41. Next, as shown in FIG. 13D, for example, novolac resin positive type photosensitive resist is coated on the whole substrate surface, and a linear projection 42 with a specified arrangement pattern is formed using a photolithography method. Next, as shown in FIG. 13E, for example, acrylic resin negative photosensitive resist is coated on the whole substrate surface, and column spacers 45 and 46 having specified upper bottom areas are formed at specified positions by using the photolithography method. The column spacer 45 is disposed at an arrangement density of, for example, one per five B pixels, and the column spacer 46 is arranged in every R pixel and every G pixel at an arrangement density of one per one. The opposite substrate 4 is manufactured through the above steps.

Figure 14A:
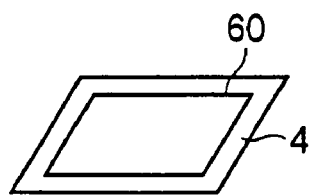
FIGS. 14A to 14F are views showing manufacturing steps of a liquid crystal display panel using an ODP method.
Figure 14B:
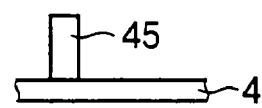
Figure 14C:
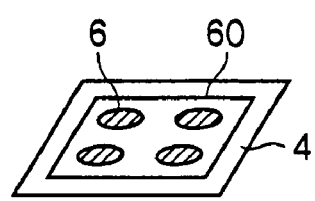
Figure 14D:
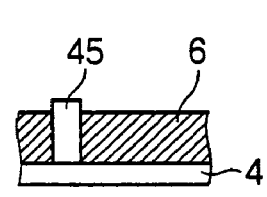
Figure 14E:
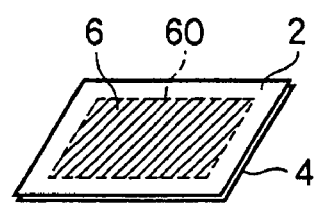
Figure 14F:
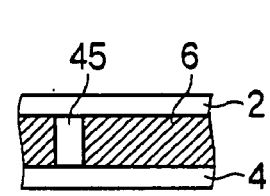
Figure 15:
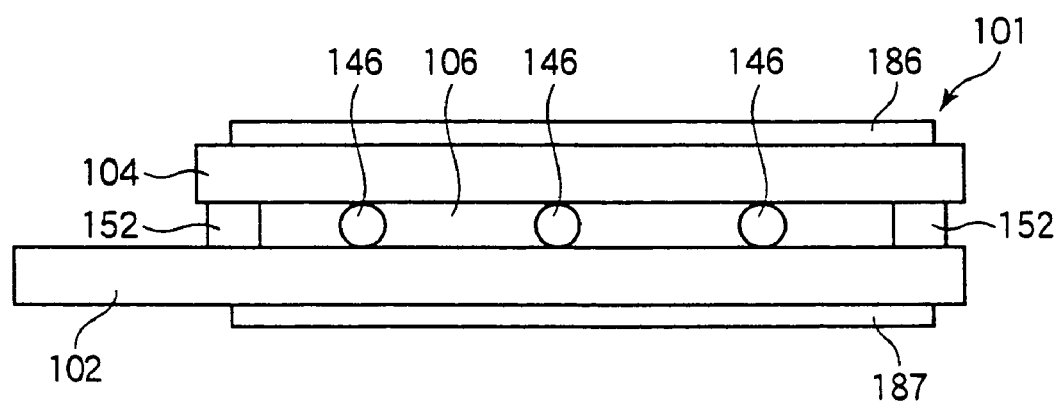
FIG. 15 is a view showing a rough sectional structure of a conventional liquid crystal display device.
Figure 16A:
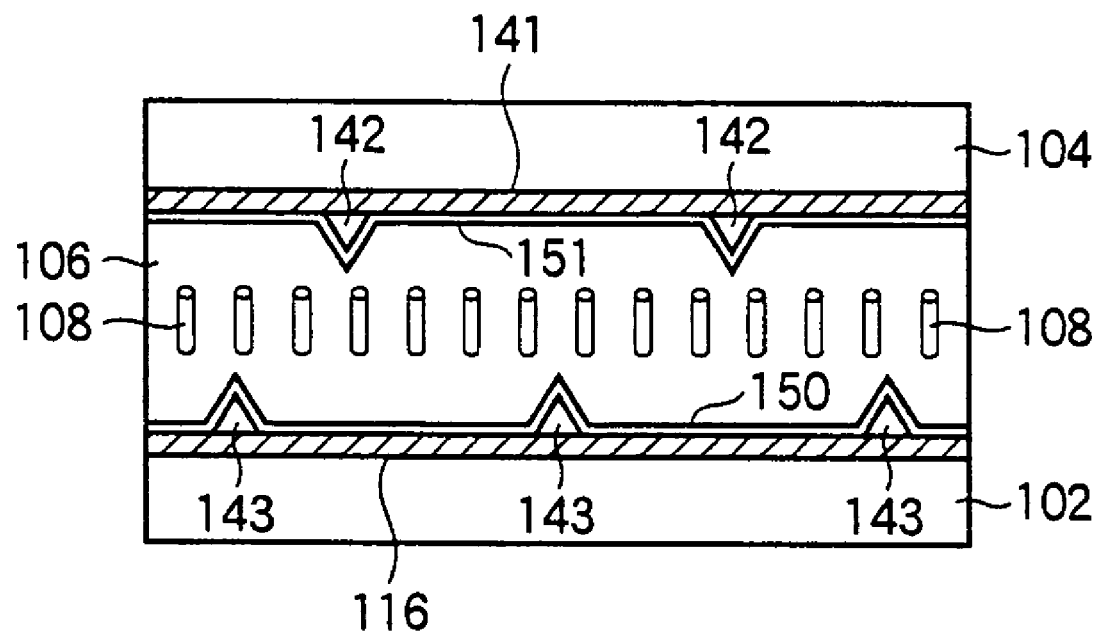
FIGS. 16A and 16B are views schematically showing sectional structures of an MVA type liquid crystal display device.
Figure 16B:
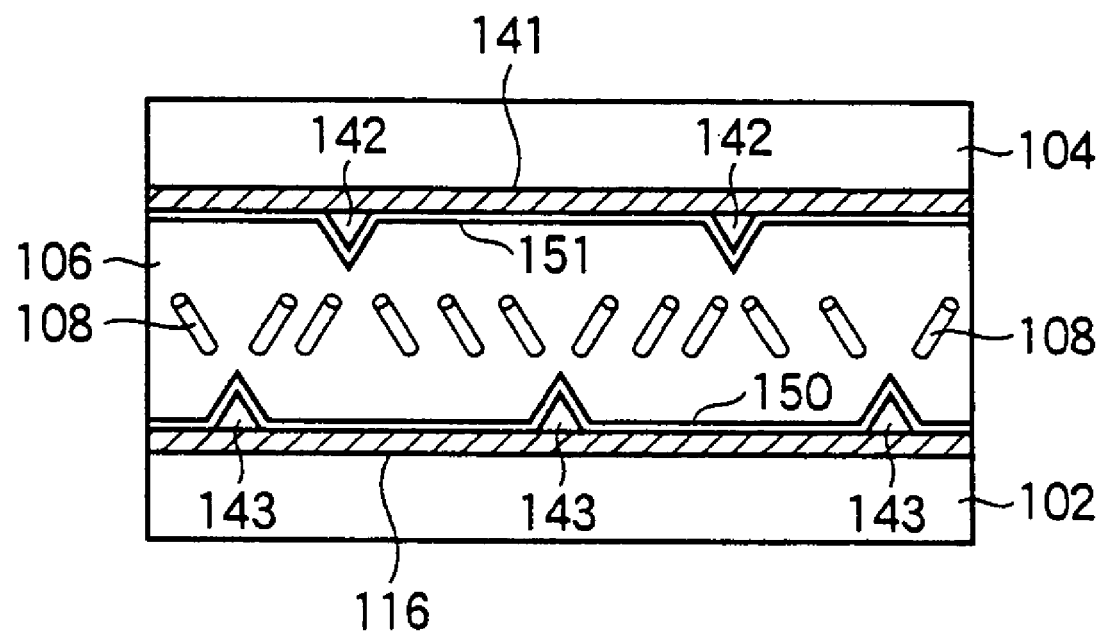
Figure 17:
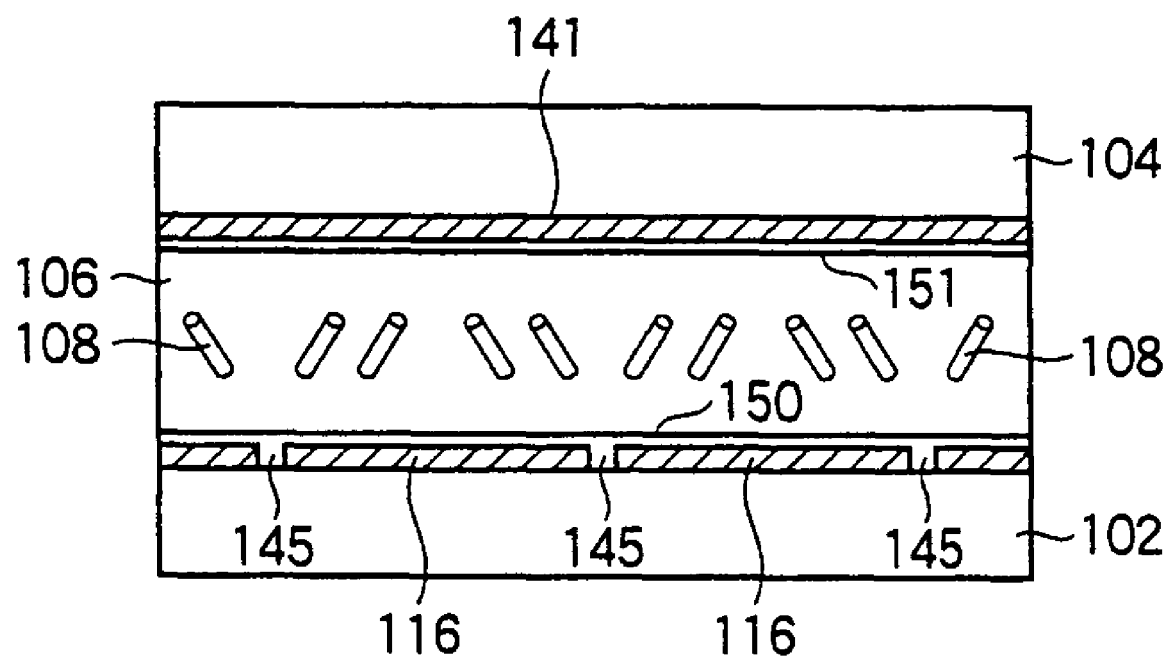
FIG. 17 is a view schematically showing another example of a sectional structure of an MVA type liquid crystal display device.
Figure 18:
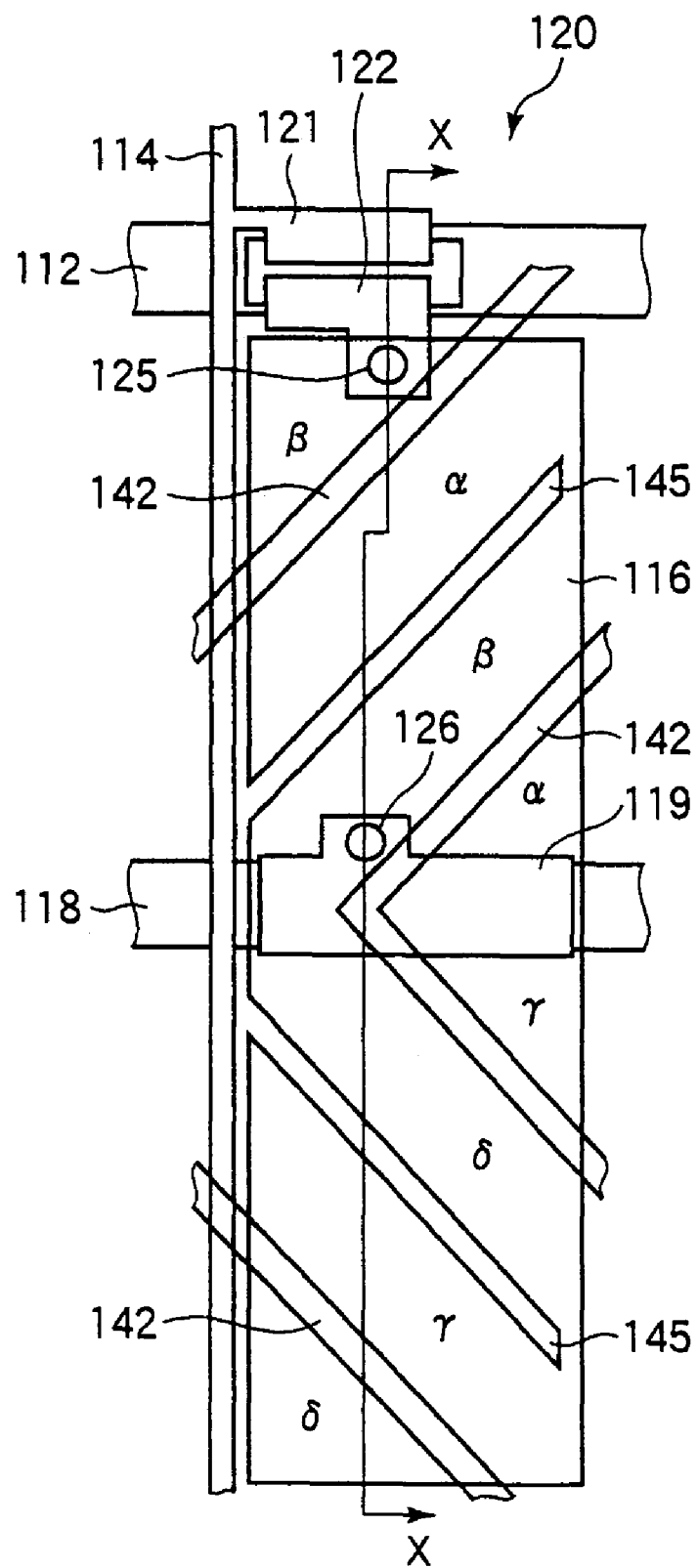
FIG. 18 is a view showing a structure of one pixel of an MVA type liquid crystal display device.
Figure 19:
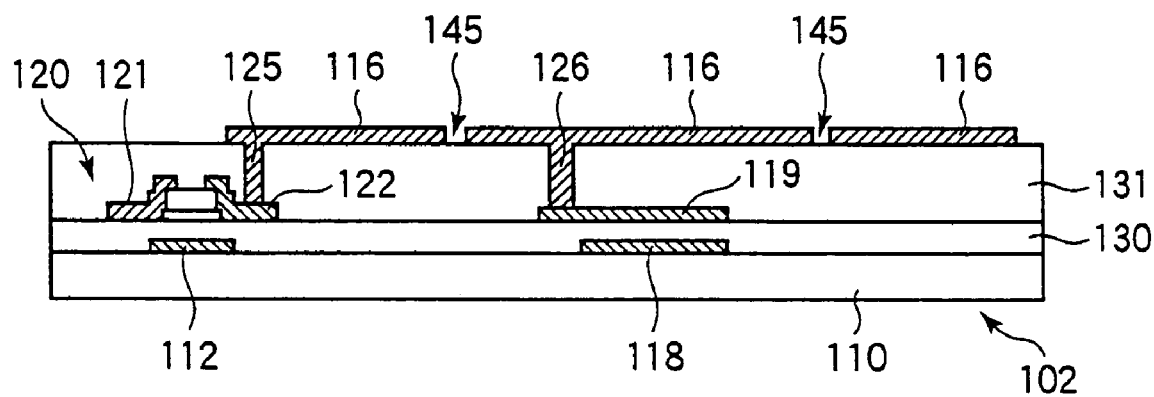
FIG. 19 is a view showing a sectional structure of the MVA type liquid crystal display device.
Figure 20:
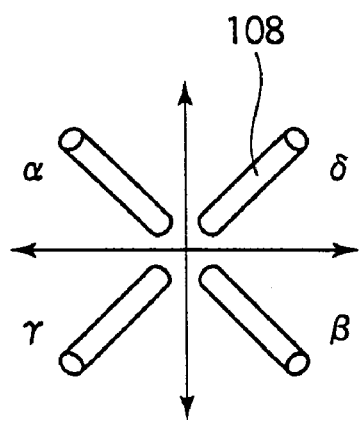
FIG. 20 is a view schematically showing alignment directions of liquid crystal molecules of the MVA type liquid crystal display device.
Figure 21:
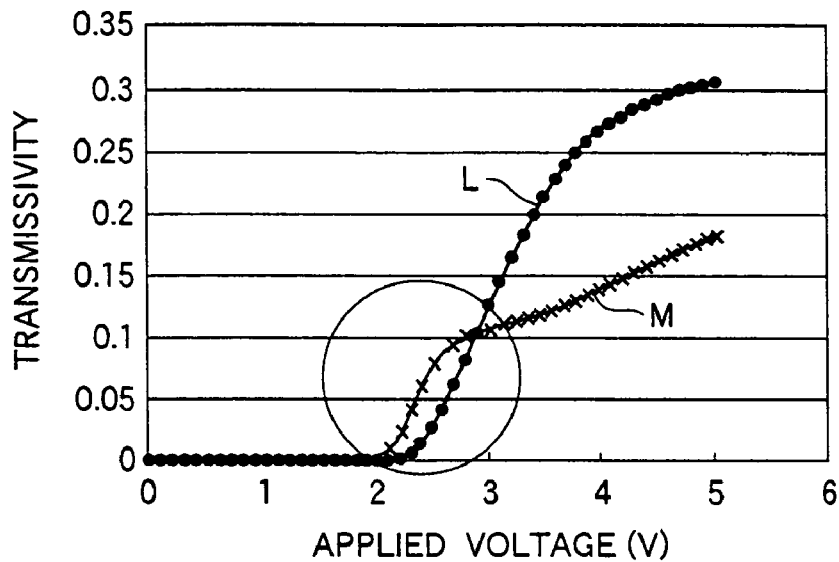
FIG. 21 is a graph showing T-V characteristics of the MVA type liquid crystal display device.
Figure 22:
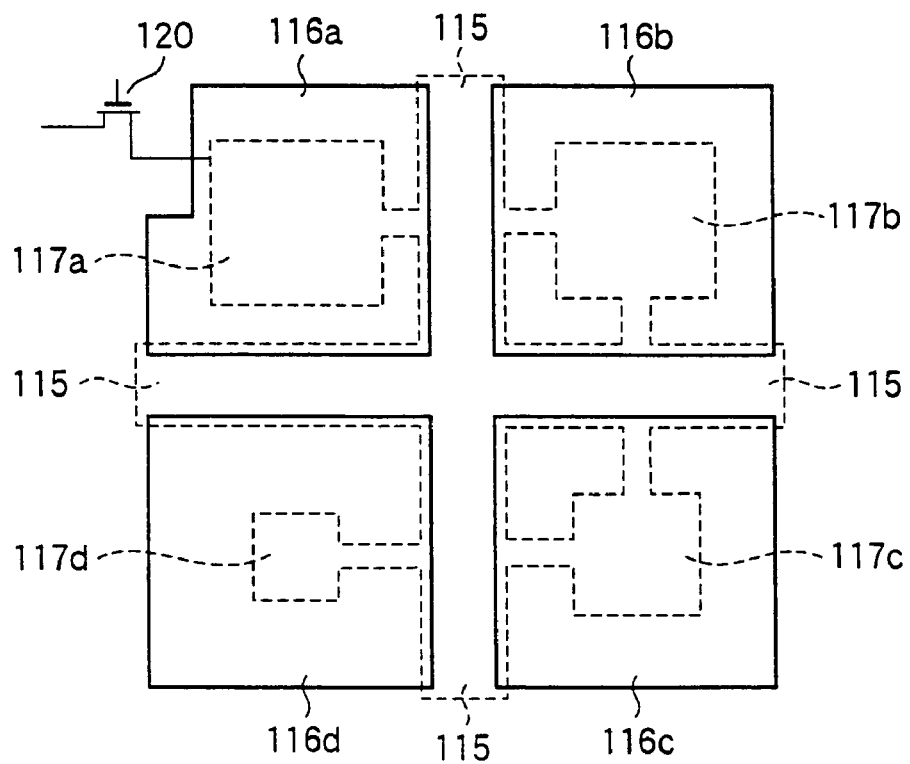
FIG. 22 is a view showing a structure of a liquid crystal display device disclosed in patent document 2.
Figure 23:
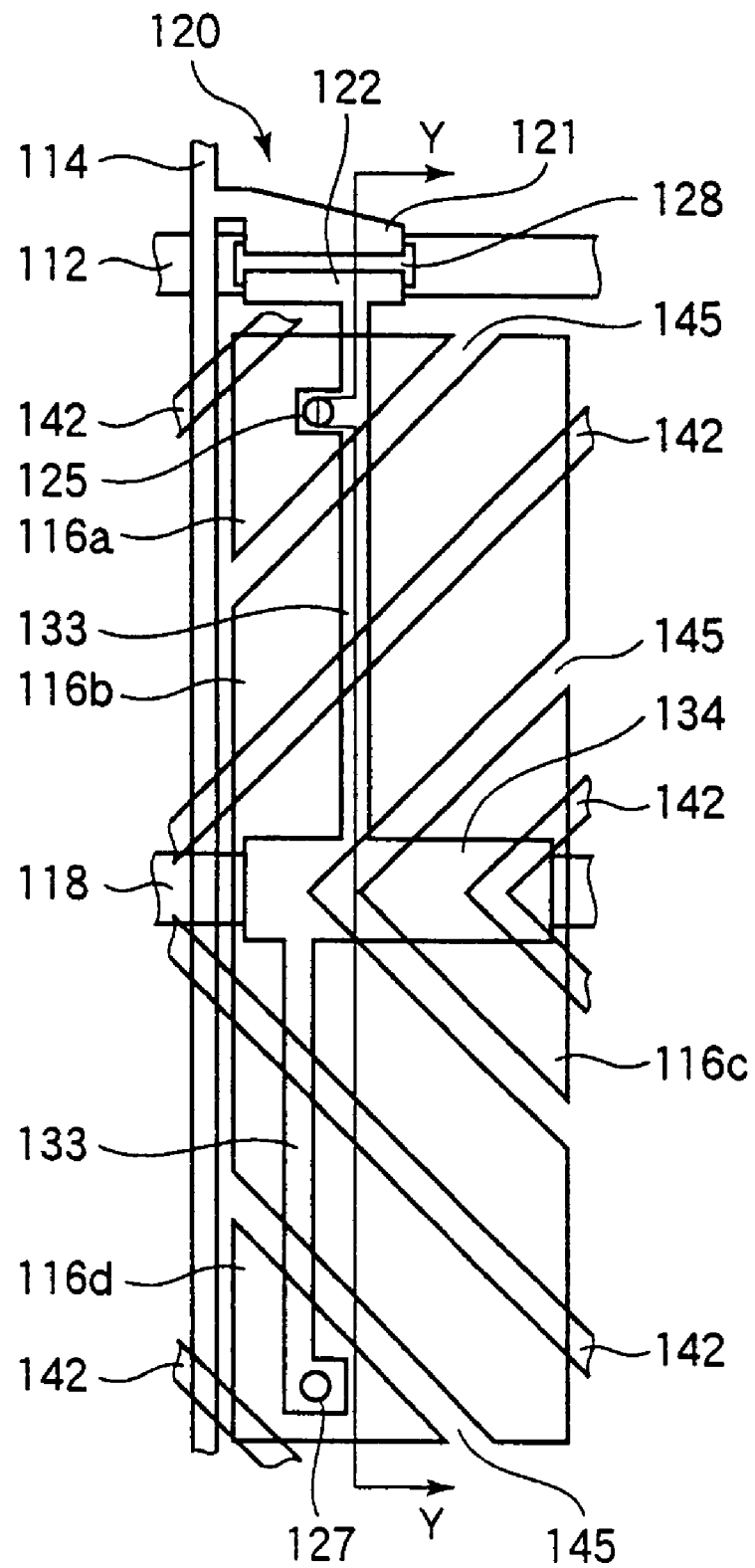
FIG. 23 is a view showing a structure of one pixel of a conventional MVA type liquid crystal display device using a capacitive coupling HT method.
Figure 24:
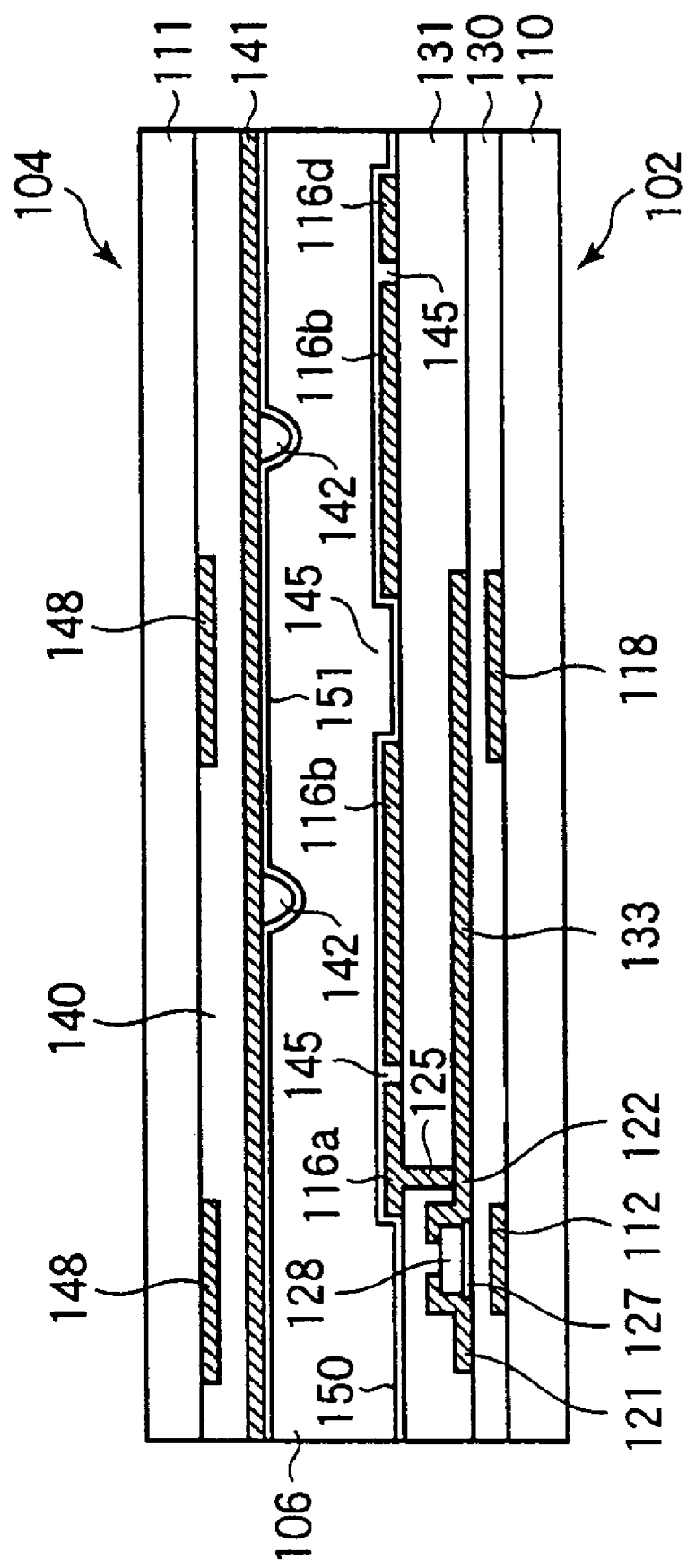
FIG. 24 is a view showing a sectional structure of the conventional MVA type liquid crystal display device using the capacitive coupling HT method.

FIGS. 14A to 14F are views showing manufacture steps of the liquid crystal display panel using the ODF method. FIGS. 14A, 14C and 14E are perspective views showing states of the opposite substrate 4 at respective steps, and FIGS. 14B, 14D and 14F are schematic sectional views showing states of the vicinity of the column spacer 45 (or 46) at the respective steps. First, an alignment film is formed on the surface of the opposite substrate 4 and the TFT substrate 2 manufactured at a separate step, and as shown in FIGS. 14A and 14B, a photo-curing sealing material 60 is coated continuously on, for example, the whole outer periphery of the opposite substrate 4. Next, as shown in FIGS. 14C and 14D, a specified amount of liquid crystal 6 is dropped on the opposite substrate 4. Incidentally, FIG. 14D shows the liquid crystal 6 in a state where it is filled at an after-mentioned step, not the liquid crystal 6 in a dropped state. Next, as shown in FIGS. 14E and 14F, the opposite substrate 4 and the TFT substrate 2 are bonded to each other in vacuum, and pressure is returned to the atmospheric pressure so that the liquid crystal 6 is filled between the substrates 2 and 4. At this time, the cell gap is controlled by the drop amount of the liquid crystal 6, and the column spacer 45 comes in contact with the TFT substrate 2 and is compressed by a predetermined variation amount. After the sealing material 60 is hardened, the liquid crystal display panel is completed through steps of panel cutting, polarizing plate bonding and the like. Thereafter, the liquid crystal display device is completed through a module step and the like.

The invention is not limited to the above embodiments, but can be variously modified.

For example, in the embodiments, although the transmission liquid crystal display device is used as the example, the invention is not limited to this, but can be applied to another liquid crystal display device of a reflection type, semi-transmission type or the like.

Besides, in the embodiments, the liquid crystal display device including the pixel area having two sub-pixels is used as the example, the invention is not limited to this, but can be applied to a liquid crystal display device including a pixel area having three or more sub-pixels.

Further, in the embodiments, although the liquid crystal display device including the channel etch TFT is used as the example, the invention is not limited to this, but can be applied to a liquid crystal display device including a channel protection film type TFT.

What is claimed is:
1. A liquid crystal display device comprising:
a first and second substrate;
an alignment regulating structure provided on the second substrate;

a plurality of pixel areas provided, each of the pixel areas including a first sub-pixel electrode and a second sub-pixel electrode provided on the first substrate;

a transistor provided in each of the pixel areas, the transistor including gate, drain and source electrodes;

a storage capacitor bus line provided on the first substrate and intersecting with at least one of the pixel areas; and a control capacitance electrode provided on the first substrate, the control capacitance electrode including a first portion which is electrically connected to the source electrode of the transistor, a second portion which is connected to the first sub-pixel electrode via a contact hole and which is entirely provided within an area where the first sub-pixel electrode overlaps the storage capacitor bus line and a third portion between the first portion and the second portion, the third portion overlapping the second sub-pixel electrode, wherein the source electrode is closer to the first portion than the second portion.

2. The liquid crystal display device of claim 1, wherein an electrical path is formed on the first substrate between the source electrode and the first sub-pixel electrode.

3. The liquid crystal display device of claim 2, wherein the electrical path between the source electrode and the first sub-pixel electrode is formed via the connection between the first sub-pixel electrode and the second portion of the control capacitance electrode.

4. The liquid crystal display device of claim 2, wherein the control capacitance electrode includes an inclined portion at least partially overlapping the alignment regulating structure the inclined portion of the control capacitance electrode is branched from the electrical path.

5. The liquid crystal display device of claim 1, wherein the control capacitance electrode is capacitively coupled with the second sub-pixel electrode.

6. The liquid crystal display device of claim 1, wherein the control capacitance electrode includes a portion at least partially overlapping the alignment regulating structure.

7. The liquid crystal display device of claim 6, wherein the inclined portion of the control capacitance electrode and the storage capacitor bus line forms an angle of 45 degrees.

8. The liquid crystal display device of claim 1, wherein the alignment regulating structure is a linear protrusion.

9. The liquid crystal display device of claim 1, wherein the first portion is provided between the source electrode and a point before an area where the control capacitance electrode overlaps the second sub-pixel electrode.

10. The liquid crystal display device of claim 1, wherein the entire third portion overlaps the second sub-pixel electrode.

* * * * *

UNITED STATES PATENT AND TRADEMARK OFFICE
CERTIFICATE OF CORRECTION

| | | |
|---|---|---|
| PATENT NO. | : 7,911,549 B2 | Page 1 of 1 |
| APPLICATION NO. | : 12/314974 | |
| DATED | : March 22, 2011 | |
| INVENTOR(S) | : Misaki et al. | |

It is certified that error appears in the above-identified patent and that said Letters Patent is hereby corrected as shown below:

On the cover page, item (75) Inventors, change Kenichi Nagaoka's city of residence to Tokyo.

Signed and Sealed this
Twenty-first Day of February, 2012

David J. Kappos
*Director of the United States Patent and Trademark Office*